(12) United States Patent
Otanez et al.

(10) Patent No.: US 10,661,804 B2
(45) Date of Patent: May 26, 2020

(54) SHIFT MANAGEMENT IN MODEL PREDICTIVE BASED PROPULSION SYSTEM CONTROL

(71) Applicant: GM GLOBAL TECHNOLOGY OPERATIONS LLC, Detroit, MI (US)

(72) Inventors: Paul G. Otanez, Franklin, MI (US); Michael Livshiz, Ann Arbor, MI (US); Christopher J. Weingartz, Fenton, MI (US); Cole Reinhold, Linden, MI (US); Michael T. Sarzynski, Royal Oak, MI (US); Mateusz M. Nowak, Dearborn, MI (US); Bharath Pattipati, South Lyon, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 137 days.

(21) Appl. No.: 15/950,097

(22) Filed: Apr. 10, 2018

(65) Prior Publication Data

US 2019/0308626 A1    Oct. 10, 2019

(51) Int. Cl.
*B60W 10/06*      (2006.01)
*B60W 10/107*    (2012.01)
(Continued)

(52) U.S. Cl.
CPC .......... *B60W 30/188* (2013.01); *B60W 10/06* (2013.01); *B60W 10/107* (2013.01);
(Continued)

(58) Field of Classification Search
CPC .. B60W 10/06; B60W 10/107; B60W 30/188; B60W 30/19; B60W 2710/1005; F16H 2061/009; F16H 2061/66204
See application file for complete search history.

(56) References Cited

U.S. PATENT DOCUMENTS 4,161,929 A    7/1979  Nohira et al.
5,101,786 A    4/1992  Kamio et al.
(Continued)

FOREIGN PATENT DOCUMENTS

CN    1594846 A        3/2005
WO    2003065135 A1    8/2003

OTHER PUBLICATIONS

John C.G. Boot, "Quadratic Programming: Algorithms, Anomalies, Applications, vol. 2 of Studies in Mathematical and Managerial Economics," North Holland Publ. Comp., 1964; 213 pages.
(Continued)

*Primary Examiner* — Edwin A Young

(57) ABSTRACT

A propulsion system, control system, and method use model predictive control systems to generate a plurality of sets of possible command values and determine a cost for each set of possible command values. The set of possible command values that has the lowest cost is determined and defined as a selected set of command values. In some circumstances, the MPC-determined command value may be replaced by another transmission ratio command based on override inputs. Minimum and maximum transmission ratios are determined based on the override inputs, and a constrained (or arbitrated) transmission ratio is determined therefrom. The constrained or arbitrated transmission ratio is used to determine whether to apply an MPC-determined transmission ratio or a transmission ratio based on the arbitrated transmission ratio to determine an ultimate commanded transmission ratio. Pressure(s) are commanded to a transmission pulley assembly, which is configured to implement the ultimate commanded transmission ratio.

20 Claims, 5 Drawing Sheets

(51) Int. Cl.
*B60W 30/188* (2012.01)
*B60W 30/18* (2012.01)

(52) U.S. Cl.
CPC ........... *B60W 30/18072* (2013.01); *B60W 30/18136* (2013.01); *B60W 2510/069* (2013.01); *B60W 2510/0623* (2013.01); *B60W 2510/0657* (2013.01); *B60W 2510/0676* (2013.01); *B60W 2510/101* (2013.01); *B60W 2510/107* (2013.01); *B60W 2520/30* (2013.01); *B60W 2520/40* (2013.01); *B60W 2540/16* (2013.01); *B60W 2550/13* (2013.01); *B60W 2710/0666* (2013.01); *B60W 2710/1005* (2013.01); *B60W 2710/1083* (2013.01)

(56) References Cited

U.S. PATENT DOCUMENTS

| | | |
|---|---|---|
| 5,706,780 A | 1/1998 | Shirakawa |
| 5,727,528 A | 3/1998 | Hori et al. |
| 5,775,293 A | 7/1998 | Kresse |
| 5,921,219 A | 7/1999 | Frohlich et al. |
| 6,014,955 A | 1/2000 | Hosotani et al. |
| 6,155,230 A | 12/2000 | Iwano et al. |
| 6,173,226 B1 | 1/2001 | Yoshida |
| 6,276,333 B1 | 8/2001 | Kazama et al. |
| 6,532,935 B2 | 3/2003 | Ganser et al. |
| 6,606,981 B2 | 8/2003 | Itoyama |
| 6,704,638 B2 | 3/2004 | Livshiz et al. |
| 6,704,641 B2 | 3/2004 | Tashiro et al. |
| 6,826,904 B2 | 12/2004 | Miura |
| 6,840,215 B1 | 1/2005 | Livshiz et al. |
| 6,953,024 B2 | 10/2005 | Linna et al. |
| 6,993,901 B2 | 2/2006 | Shirakawa |
| 7,016,779 B2 | 3/2006 | Bowyer |
| 7,021,282 B1 | 4/2006 | Livshiz et al. |
| 7,051,058 B2 | 5/2006 | Wagner et al. |
| 7,222,012 B2 | 5/2007 | Simon, Jr. |
| 7,235,034 B2 | 6/2007 | Berglund et al. |
| 7,236,874 B2 | 6/2007 | Ichihara |
| 7,274,986 B1 | 9/2007 | Petridis et al. |
| 7,275,518 B1 | 10/2007 | Gartner et al. |
| 7,356,403 B2 | 4/2008 | Yoshioka et al. |
| 7,395,147 B2 | 7/2008 | Livshiz et al. |
| 7,400,967 B2 | 7/2008 | Ueno et al. |
| 7,433,775 B2 | 10/2008 | Livshiz et al. |
| 7,441,544 B2 | 10/2008 | Hagari |
| 7,563,194 B2 | 7/2009 | Murray |
| 7,614,384 B2 | 11/2009 | Livshiz et al. |
| 7,698,048 B2 | 4/2010 | Jung |
| 7,703,439 B2 | 4/2010 | Russell et al. |
| 7,715,975 B2 | 5/2010 | Yamaoka et al. |
| 7,775,195 B2 | 8/2010 | Schondorf et al. |
| 7,777,439 B2 | 8/2010 | Falkenstein |
| 7,813,869 B2 | 10/2010 | Grichnik et al. |
| 7,885,756 B2 | 2/2011 | Livshiz et al. |
| 7,941,260 B2 | 5/2011 | Lee et al. |
| 7,949,459 B2 | 5/2011 | Yoshikawa et al. |
| 7,967,720 B2 | 6/2011 | Martin et al. |
| 7,967,729 B2 | 6/2011 | Martin et al. |
| 7,975,668 B2 | 7/2011 | Ramappan et al. |
| 7,980,221 B2 | 7/2011 | Baur et al. |
| 8,010,272 B2 | 8/2011 | Kuwahara et al. |
| 8,027,780 B2 | 9/2011 | Whitney et al. |
| 8,041,487 B2 | 10/2011 | Worthing et al. |
| 8,050,841 B2 | 11/2011 | Costin et al. |
| 8,073,610 B2 | 12/2011 | Heap et al. |
| 8,078,371 B2 | 12/2011 | Cawthorne |
| 8,086,390 B2 | 12/2011 | Whitney et al. |
| 8,103,425 B2 | 1/2012 | Choi et al. |
| 8,103,428 B2 | 1/2012 | Russ et al. |
| 8,116,954 B2 | 2/2012 | Livshiz et al. |
| 8,121,763 B2 | 2/2012 | Hou |
| 8,176,735 B2 | 5/2012 | Komatsu |
| 8,181,627 B2 | 5/2012 | Sharples et al. |
| 8,209,102 B2 | 6/2012 | Wang et al. |
| 8,209,104 B2 | 6/2012 | Soejima et al. |
| 8,219,304 B2 | 7/2012 | Soma |
| 8,241,177 B2 | 8/2012 | Doering et al. |
| 8,307,814 B2 | 11/2012 | Leroy et al. |
| 8,316,828 B2 | 11/2012 | Whitney et al. |
| 8,447,492 B2 | 5/2013 | Watanabe et al. |
| 8,468,821 B2 | 6/2013 | Liu et al. |
| 8,483,935 B2 | 7/2013 | Whitney et al. |
| 8,527,120 B2 | 9/2013 | Matthews et al. |
| 8,560,204 B2 | 10/2013 | Simon et al. |
| 8,566,008 B2 | 10/2013 | Soejima et al. |
| 8,593,806 B2 | 11/2013 | Huang |
| 8,594,904 B2 | 11/2013 | Livshiz et al. |
| 8,635,001 B2 | 1/2014 | Doering et al. |
| 8,739,766 B2 | 6/2014 | Jentz et al. |
| 8,744,716 B2 | 6/2014 | Kar |
| 8,862,248 B2 | 10/2014 | Yasui |
| 8,954,257 B2 | 2/2015 | Livshiz et al. |
| 8,977,457 B2 | 3/2015 | Robinette et al. |
| 9,031,766 B2 | 5/2015 | DeLaSalle et al. |
| 9,062,631 B2 | 6/2015 | Kinugawa et al. |
| 9,067,593 B2 | 6/2015 | Dufford |
| 9,075,406 B2 | 7/2015 | Nakada |
| 9,145,841 B2 | 9/2015 | Miyazaki et al. |
| 9,175,622 B2 | 11/2015 | Seiberlich et al. |
| 9,175,628 B2 | 11/2015 | Livshiz et al. |
| 9,222,426 B2 | 12/2015 | Rollinger et al. |
| 9,243,524 B2 | 1/2016 | Whitney et al. |
| 9,328,671 B2 | 5/2016 | Whitney et al. |
| 9,334,815 B2 | 5/2016 | Cygan, Jr. et al. |
| 9,347,381 B2 | 5/2016 | Long et al. |
| 9,376,965 B2 | 6/2016 | Whitney et al. |
| 9,378,594 B2 | 6/2016 | Wong et al. |
| 9,382,865 B2 | 7/2016 | Genslak et al. |
| 9,388,754 B2 | 7/2016 | Cygan, Jr. et al. |
| 9,388,758 B2 | 7/2016 | Pochner et al. |
| 9,399,959 B2 | 7/2016 | Whitney et al. |
| 9,429,085 B2 | 8/2016 | Whitney et al. |
| 9,435,274 B2 | 9/2016 | Wong et al. |
| 9,447,632 B2 | 9/2016 | LeBlanc |
| 9,528,453 B2 | 12/2016 | Whitney et al. |
| 9,534,547 B2 | 1/2017 | Livshiz et al. |
| 9,541,019 B2 | 1/2017 | Verdejo et al. |
| 9,587,573 B2 | 3/2017 | Genslak et al. |
| 9,599,049 B2 | 3/2017 | Zavala Jurado et al. |
| 9,599,053 B2 | 3/2017 | Long et al. |
| 9,605,615 B2 | 3/2017 | Long et al. |
| 9,669,822 B2 | 6/2017 | Piper et al. |
| 9,714,616 B2 | 7/2017 | Jin et al. |
| 9,732,499 B2 | 8/2017 | Miyamoto et al. |
| 9,732,688 B2 | 8/2017 | Cygan, Jr. et al. |
| 9,765,703 B2 | 9/2017 | Whitney et al. |
| 9,784,198 B2 | 10/2017 | Long et al. |
| 9,789,876 B1 | 10/2017 | Livshiz et al. |
| 9,797,318 B2 | 10/2017 | Storch et al. |
| 9,863,345 B2 | 1/2018 | Wong et al. |
| 9,920,697 B2 | 3/2018 | Pochner et al. |
| 9,927,780 B2 | 3/2018 | Sun et al. |
| 9,963,150 B2 | 5/2018 | Livshiz et al. |
| 10,047,686 B2 | 8/2018 | Jin |
| 10,094,300 B2 | 10/2018 | Cygan, Jr. et al. |
| 10,167,746 B2 | 1/2019 | Whitney et al. |
| 10,273,900 B2 | 4/2019 | Whitney et al. |
| 2004/0116220 A1 | 6/2004 | Yamamoto et al. |
| 2005/0065691 A1 | 3/2005 | Cho |
| 2006/0073924 A1* | 4/2006 | Izumi ............... F16H 61/66254 474/28 |
| 2007/0191181 A1 | 8/2007 | Burns |
| 2009/0288899 A1 | 11/2009 | Belloso |
| 2010/0211294 A1 | 8/2010 | Soejima |
| 2011/0053720 A1* | 3/2011 | Kang ............... F16H 37/021 474/148 |
| 2012/0010860 A1 | 1/2012 | Kirkling et al. |
| 2016/0290502 A1* | 10/2016 | Yamanaka ............ B60K 6/48 |
| 2016/0363063 A1 | 12/2016 | Pochner et al. |
| 2017/0016407 A1 | 1/2017 | Whitney et al. |
| 2017/0082055 A1 | 3/2017 | Cygan et al. |

(56) References Cited

U.S. PATENT DOCUMENTS

2017/0306819 A1 10/2017 Alfieri et al.
2017/0361842 A1 12/2017 Livshiz et al.
2018/0293814 A1 10/2018 Gilbert et al.

OTHER PUBLICATIONS

N. Lawrence Ricker, "Use of Quadratic Programming for Constrained Internal Model Control," Ind. Eng. Chem. Process Des. Dev., 1985, pp. 925-936.

C. E. Lemke, "A Method of Solution for Quadratic Programs," Rensselaer Polytechnic Institute, Troy, New York, Published Online: Jul. 1, 1962, pp. 442-453.

Kolmanovsky I., "Towards Engine and Powertrain Control Based on Model Predictive Control," Sep. 28, 2012, Powerpoint Presentation, 47 slides.

Gorinevsky, Lecture 14—Model Predictive Control Part 1: The Concept, Spring 2005, Powerpoint Presentation, 26 slides.

Bemporad, Alberto, "Model Predictive Control," Spring 2005, Powerpoint Presentation, 94 slides.

U.S. Appl. No. 15/436,235, filed Feb. 17, 2017; Applicant: GM Global Technology Operations LLC; Title: Torque Security of MPC-Based Powertrain Control.

U.S. Appl. No. 15/465,647, filed Mar. 22, 2017; Applicant: GM Global Technology Operations LLC; Title: Coordination of Torque Interventions in MPC-Based Powertrain Control.

U.S. Appl. No. 15/697,748, filed Sep. 7, 2017; Applicant: GM Global Technology Operations LLC; Title: Fuel Economy Optimization Using Air-Per-Cylinder (APC) in MPC-Based Powertrain Control.

U.S. Appl. No. 15/719,963, filed Sep. 29, 2017; Applicant: GM Global Technology Operations LLC; Title: Linearized Model Based Powertrain MPC.

U.S. Appl. No. 15/937,128, filed Mar. 27, 2018; Applicant: GM Global Technology Operations LLC; Title: Consolidation of Constraints in Model Predictive Control.

* cited by examiner

SHIFT MANAGEMENT IN MODEL PREDICTIVE BASED PROPULSION SYSTEM CONTROL

TECHNICAL FIELD

The disclosure relates to a control system and method for a propulsion system of a motor vehicle having an engine and a transmission, and more particularly to a control system and method that uses a multivariable controller.

INTRODUCTION

Propulsion system control in a motor vehicle generally involves reading driver and vehicle inputs, such as accelerator pedal position, vehicle sensor data, and torque requests, and communicating these inputs to an Engine Control Module (ECM) and a Transmission Control Module (TCM). The ECM may calculate a requested axle torque from the driver and vehicle inputs. The requested axle torque may then be communicated to the engine and to the ECM. The engine is controlled based on the requested axle torque to produce an actual axle torque. Meanwhile, and typically concurrently with calculating desired engine and axle torques, a desired transmission ratio is calculated from the requested axle torque and the vehicle speed. The desired transmission ratio, which may be CVT pulley ratio, is then communicated to the transmission. The transmission is controlled based on the desired transmission ratio to produce an actual transmission ratio. The actual axle torque and the actual transmission ratio define the operating conditions of the motor vehicle.

Model predictive control (MPC) may be used for determining a desired transmission ratio and a desired engine output torque, to optimize transient control and improve fuel economy, as described in U.S. Pat. No. 9,789,876 and U.S. Patent Application Publication No. 2017/0361842. However, in certain circumstances, other shift patterns or pulley ratios may be desirable. For example, under certain circumstances, vehicle drivability may be more important than fuel economy, and a pulley ratio determined by the model predictive control system should be replaced with another pulley ratio.

SUMMARY

The present disclosure provides an architecture and signal content to coordinate control of the transmission ratio when going to/from fuel economy and drivability modes. Ratio constraints are calculated and used to determine whether to use the transmission ratio determined by an MPC module or whether to use another transmission ratio. Ratio rate constraints may also be calculated and used when changing between MPC control and other control. The system may be configured to place a higher priority on drivability than fuel economy.

In one form, which may be combined with or separate from other forms disclosed herein, the present disclosure provides a control system for a propulsion system of a motor vehicle having a transmission and an engine. The control system includes a first control module and a second control module. The first control module has a reference generator configured to generate a plurality of requested values including an initial requested transmission ratio. The first control module also has an MPC module configured to generate a plurality of sets of possible command values including a possible commanded transmission ratio, determine a cost for each set of possible command values based at least on a first predetermined weighting value, a second predetermined weighting value, a plurality of predicted values, and at least one of the requested values, determine which set of possible command values has a lowest cost, and select the set of possible command values that has the lowest cost to define a set of selected command values including an MPC-selected commanded transmission ratio. The second control module has a constraints module configured to determine a maximum transmission ratio and a minimum transmission ratio based on a plurality of override inputs. The second control module is configured to determine an arbitrated requested transmission ratio based on applying the maximum transmission ratio and the minimum transmission ratio to the initial requested transmission ratio. The second control module also has a takeover module and a ratio control module. The takeover module is configured to determine whether the arbitrated requested transmission ratio is in a takeover range. The ratio control module is configured to: A) set an ultimate commanded transmission ratio based on the arbitrated requested transmission ratio if the arbitrated requested transmission ratio is within the takeover range; B) set the ultimate commanded transmission ratio as the MPC-selected commanded transmission ratio if the arbitrated requested transmission ratio is in an MPC-control range, the MPC-control range and the takeover range being mutually exclusive; and C) command pressures to a transmission pulley assembly configured to implement the ultimate commanded transmission ratio (typically, one pressure is commanded to the primary pulley assembly, and another pressure is commanded to the secondary pulley assembly).

In another form, which may be combined with or separate from the other forms disclosed herein, a method for controlling a propulsion system of a motor vehicle is provided. The method includes determining an initial requested transmission ratio and determining a maximum transmission ratio and a minimum transmission ratio based on a plurality of override inputs. The method also includes determining an arbitrated requested transmission ratio based on applying the maximum transmission ratio and the minimum transmission ratio to the initial requested transmission ratio. The method then includes determining whether the arbitrated requested transmission ratio is within a takeover range. If the arbitrated requested transmission ratio is within the takeover range, the method includes determining an ultimate commanded transmission ratio as being based on the arbitrated transmission ratio requested. However, if the arbitrated requested transmission ratio is outside of the takeover range, the method includes determining the ultimate commanded transmission ratio by generating a plurality of sets of possible command values, each set of possible command values including a possible commanded transmission ratio, determining a cost for each set of possible command values of the plurality of sets of possible command values based on a first predetermined weighting value, a second predetermined weighting value, a plurality of predicted values, and a plurality of requested values including the initial requested transmission ratio, determining which set of possible command values of the plurality of sets of possible command values has a lowest cost, and selecting the set of possible command values that has the lowest cost to define a set of selected command values including the ultimate commanded transmission ratio. The method includes commanding a predetermined pressure to a transmission pulley assembly to implement the ultimate commanded transmission ratio, the predetermined pressure being determined based on the ultimate commanded transmission ratio.

In yet another form, which may be combined with or separate from the other forms disclosed herein, a propulsion system for a motor vehicle is provided. The propulsion system includes an engine, a continuously variable transmission (CVT), an engine control module, and a transmission control module. The engine is operable to power the motor vehicle, and the engine has an engine output shaft configured to transfer engine output torque. The CVT has a variator assembly including a first pulley and a second pulley, the first and second pulleys being rotatably coupled by a rotatable member, such as a belt or chain. At least one of the pulleys includes a movable sheave translatable along an axis to selectively change a transmission ratio between the engine output shaft and a transmission output shaft. The engine control module includes an MPC module and a reference generator configured to generate a plurality of requested values including an initial requested transmission ratio. The MPC module is configured to generate a plurality of sets of possible command values including a possible commanded transmission ratio, determine a cost for each set of possible command values based at least on a first predetermined weighting value, a second predetermined weighting value, a plurality of predicted values, and at least one of the requested values, determine which set of the possible command values has a lowest cost, and select the set of possible command values that has the lowest cost to define a set of selected command values including an MPC-selected commanded transmission ratio. The transmission control module has a constraints module, a takeover module, and a ratio control module. The constraints module is configured to determine a maximum transmission ratio and a minimum transmission ratio based on a plurality of override inputs. The transmission control module is configured to determine an arbitrated requested transmission ratio based on applying the maximum transmission ratio and the minimum transmission ratio to the initial requested transmission ratio. The takeover module is configured to determine whether the arbitrated requested transmission ratio is in a takeover range. The ratio control module configured to: A) set an ultimate commanded transmission ratio based on the arbitrated requested transmission ratio if the arbitrated requested transmission ratio is within the takeover range; B) set the ultimate commanded transmission ratio as the MPC-selected commanded transmission ratio if the arbitrated requested transmission ratio is in an MPC-control range, wherein the MPC-control range and the takeover range are mutually exclusive; and C) command a pressure to a transmission pulley assembly configured to implement the ultimate commanded transmission ratio.

Additional features of the control system or control modules may be provided, including but not limited to the following: each set of possible command values including a possible commanded engine output torque; each set of selected command values including a selected commanded engine output torque; the MPC module being configured to the determine the cost based further on the ultimate commanded transmission ratio; in the takeover range, the constraints module being configured to set the arbitrated requested transmission ratio as being equal to the maximum transmission ratio and the minimum transmission ratio; the constraints module being configured to determine the maximum transmission ratio as being equal to a variator maximum ratio and the minimum transmission ratio as being equal to a variator minimum ratio in an unrestricted portion of the MPC-control range; the constraints module being configured to determine that the maximum transmission ratio, the minimum transmission ratio, and the arbitrated requested transmission ratio are equal to the initial requested transmission ratio plus a first offset in a non-performance shift portion of the takeover range; the constraints module being configured to determine that the maximum transmission ratio, the minimum transmission ratio, and the arbitrated requested transmission ratio are equal to a performance shift ratio in a performance shift portion of the takeover range; the constraints module being further configured to determine that the minimum transmission ratio is equal to the variator minimum ratio plus a second offset and the maximum transmission ratio is equal to the variator maximum ratio plus a third offset in a partially restricted portion of the MPC-control range; further comprising a ratio rate arbitration module configured to determine a maximum transmission ratio rate of change; the control system being configured to limit a change in the ultimate commanded transmission ratio based on the maximum transmission ratio rate of change; the maximum transmission ratio rate of change being determined based on the lesser of a predetermined drivability limit and a pump flow rate capability model for an upshift; and the maximum transmission ratio rate of change being determined based on the greater of the predetermined drivability limit and the pump flow rate capability model for a downshift.

Additional features of the method may include, without limitation: providing each set of possible command values including a possible commanded engine output torque; providing each set of selected command values including a selected commanded engine output torque; determining the cost based further on the ultimate commanded transmission ratio; in the takeover range, setting the arbitrated requested transmission ratio as being equal to the maximum transmission ratio and the minimum transmission ratio; in an unrestricted portion of a MPC-control range, the MPC-control range being outside of the takeover range, determining the maximum transmission ratio as being equal to a variator maximum ratio and the minimum transmission ratio as being equal to a variator minimum ratio; in a non-performance shift portion of the takeover range, determining that the maximum transmission ratio, the minimum transmission ratio, and the arbitrated requested transmission ratio are equal to the initial requested transmission ratio plus a first offset; in a performance shift portion of the takeover range, determining that the maximum transmission ratio, the minimum transmission ratio, and the arbitrated requested transmission ratio are equal to a performance shift ratio; in a partially restricted portion of the MPC-control range, determining that the minimum transmission ratio is equal to the variator minimum ratio plus a second offset and the maximum transmission ratio is equal to the variator maximum ratio plus a third offset; determining a maximum transmission ratio rate of change; limiting a change in the ultimate commanded transmission ratio based on the maximum transmission ratio rate of change; for an upshift, determining the maximum transmission ratio rate of change based on the lesser of a predetermined drivability limit and a pump flow rate capability model; and for a downshift, determining the maximum transmission ratio rate of change based on the greater of the predetermined drivability limit and the pump flow rate capability model.

The plurality of override inputs may be selected from the following: a tap-up tap-down input (TUTD), adjustment for engine temperature, adjustment for transmission temperature, selection of a driving mode (e.g., sport, winter, economy), implementation of a reverse direction, implementation of a sawtooth ratio mode, transmission-in-service override, a manual-up manual-down input (MUMD), a default, an altitude offset, a heater performance adjustment, detection of pedal instability, implementation of a ratio hold while a driver's foot is lifted, downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, and engine overspeed protection.

The system or method may be configured to determine the plurality of costs with the following cost equation:

$$\text{Cost} = \sum (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=predicted actual engine output torque;
FR_a=predicted actual fuel consumption rate;
Rat_a=predicted actual transmission ratio;
Ta_a=predicted actual axle torque;
Te_r=requested engine output torque;
FR_r=requested fuel consumption rate;
Rat_r=one of: initial requested transmission ratio (Rat_$r_i$) and the ultimate commanded transmission ratio;
Ta_r=requested axle torque;
Te_c=possible commanded engine output torque;
Rat_c=one of: possible commanded transmission ratio and the ultimate commanded transmission ratio;
$Q_y$=the first predetermined weighting value;
$Q_u$=the second predetermined weighting value;
$Q_{\Delta u}$=a third predetermined weighting value;
i=index value;
k=prediction step; and
T=transposed vector.

The system or method may be configured to determine the predicted actual engine output torque (Te_a), the predicted actual fuel consumption rate (FR_a), the predicted actual transmission ratio (Rat_a), and the predicted actual axle torque (Ta_a) with the following set of equations:

$$x_{k+1} = \left\{ A * x_k + B * \begin{bmatrix} \text{Te\_c}_k \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

-continued $$\begin{bmatrix} \text{Ta\_a}_{k+1} \\ \text{FR\_a}_{k+1} \end{bmatrix} = C * x_{k+1} + w$$

where
$x_{k+1}$=state variable at a prediction step k+1;
$x_k$=state variable at a prediction step k;
A=a state matrix;
B=an input matrix;
Te_$c_k$=possible commanded engine output torque at the prediction step k;
Rat_$c_k$=one of: possible commanded transmission ratio at the prediction step k and the ultimate commanded transmission ratio;
$K_{KF}$=a Kalman filter gain;
Te_$a_k$=predicted actual engine output torque at the prediction step k;
FR_$a_k$=predicted actual fuel consumption rate at the prediction step k;
Rat_$a_k$=predicted actual transmission ratio at the prediction step k;
Ta_$a_k$=predicted actual axle torque at the prediction step k;
Te_$m_k$=measured engine output torque at the prediction step k;
FR_$m_k$=measured fuel consumption rate at the prediction step k;
Rat_$m_k$=measured transmission ratio at the prediction step k;
Ta_$m_k$=measured axle torque at the prediction step k;
Ta_$a_{k+1}$=predicted actual axle torque at the prediction step k+1;
FR_$a_{k+1}$=predicted actual fuel consumption rate at the prediction step k+1;
C=an output matrix;
v=process noise; and
w=measurement noise.

BRIEF DESCRIPTION OF THE DRAWINGS

The drawings described herein are for illustration purposes only and are not intended to limit the scope of the present disclosure in any way.

DESCRIPTION

Figure 1:
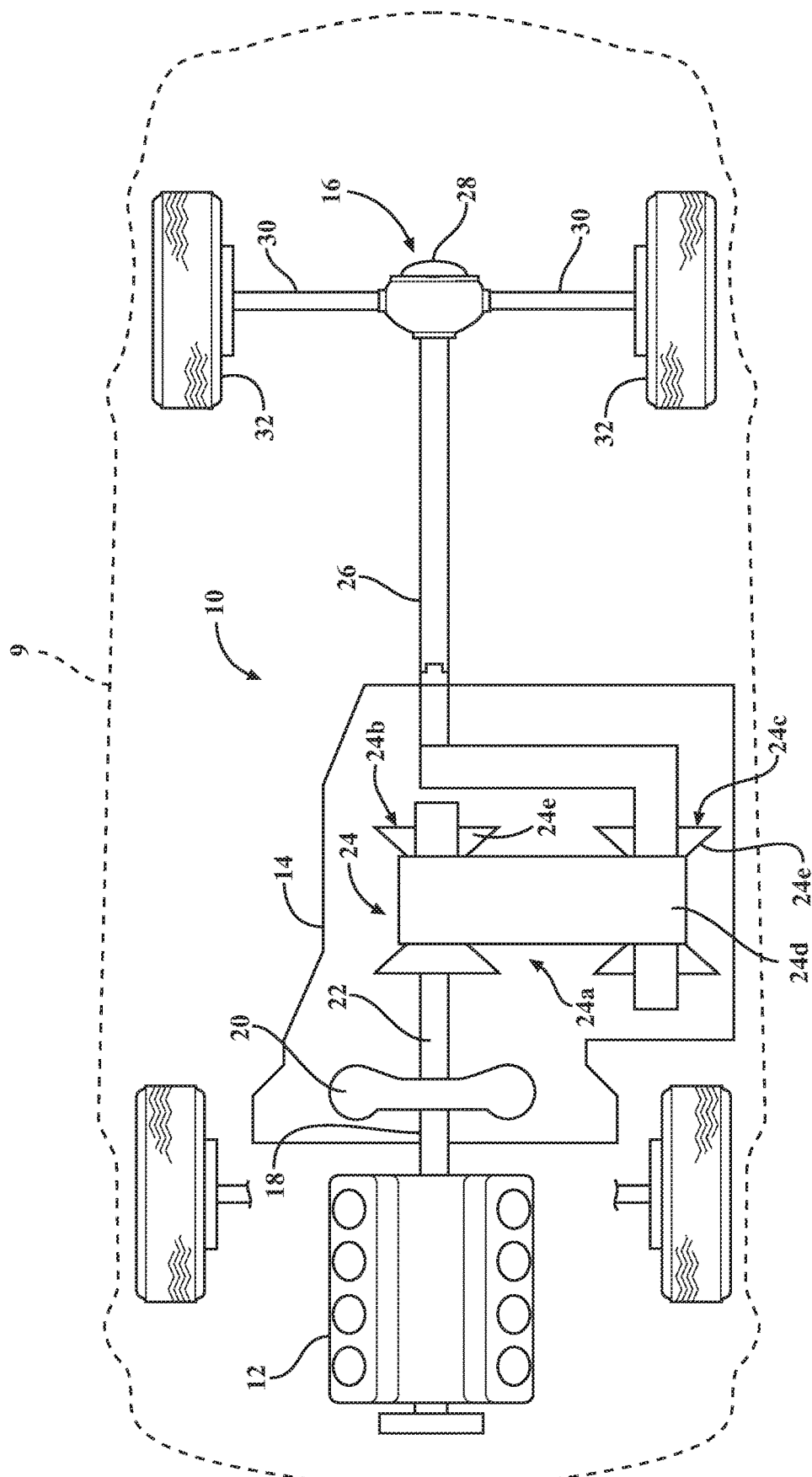
FIG. 1 is a schematic diagram of a motor vehicle having an exemplary propulsion system, in accordance with the principles of the present disclosure.

With reference to FIG. 1, an exemplary motor vehicle is shown and generally indicated by reference number 9. The motor vehicle 9 is illustrated as a passenger car, but it should be appreciated that the motor vehicle 9 may be any type of vehicle, such as a truck, van, sport-utility vehicle, etc. The motor vehicle 9 includes an exemplary propulsion system 10. It should be appreciated at the outset that while a rear-wheel drive propulsion system 10 has been illustrated, the motor vehicle 9 may have a front-wheel drive propulsion system, an all-wheel drive propulsion system, or a four-wheel drive propulsion system, without departing from the spirit and scope of the present disclosure.

The propulsion system 10 generally includes an engine 12 interconnected with a transmission 14 and a final drive unit 16. The engine 12 may be a conventional internal combustion engine or an electric engine, hybrid engine, or any other type of prime mover, without departing from the spirit and scope of the present disclosure. The engine 12 supplies a driving engine output torque to the transmission 14 via a crankshaft or engine output shaft 18. The driving engine output torque may be transmitted through a flexplate and/or starting device 20 to the transmission 14. The starting device 20 may be a hydrodynamic device, such as a fluid coupling or torque converter, a wet dual clutch, or an electric motor, by way of example. Torque is then transmitted from the starting device 20 to at least one transmission input shaft 22.

The transmission 14 may be any type of transmission, such as a stepped transmission having planetary gears, a countershaft transmission, a continuously variable transmission (CVT), or an infinitely variable transmission. Torque from the transmission input shaft 22 is communicated through a ratio control unit 24 to a transmission output shaft 26. Generally, the ratio control unit 24 provides a plurality of forward and/or reverse speed or gear ratios, or an infinite number of forward and/or reverse speed or gear ratios, between the transmission input shaft 22 and the transmission output shaft 26.

Where the transmission 14 is a CVT, the ratio control unit 24 may include a variator assembly 24a having first and second pulleys 24b, 24c that are rotatably coupled by an endless rotatable member 24d wrapped around the variable diameter pulleys 24b, 24c. At least one of the first and second pulleys 24b, 24c includes a movable sheave 24e translatable along an axis to selectively change a ratio between the engine output shaft 18 and the transmission output shaft 26.

Thus, as referred to herein, the term "speed ratio" refers to a variator speed ratio, which is a ratio of the speed of the output member 26 in relation to the speed of the input member 22. The transmission output shaft 26 communicates output torque to the final drive unit 16. The final drive unit 16 generally includes a differential 28 that transfers axle torque through drive axles 30 to drive wheels 32.

Figure 2:
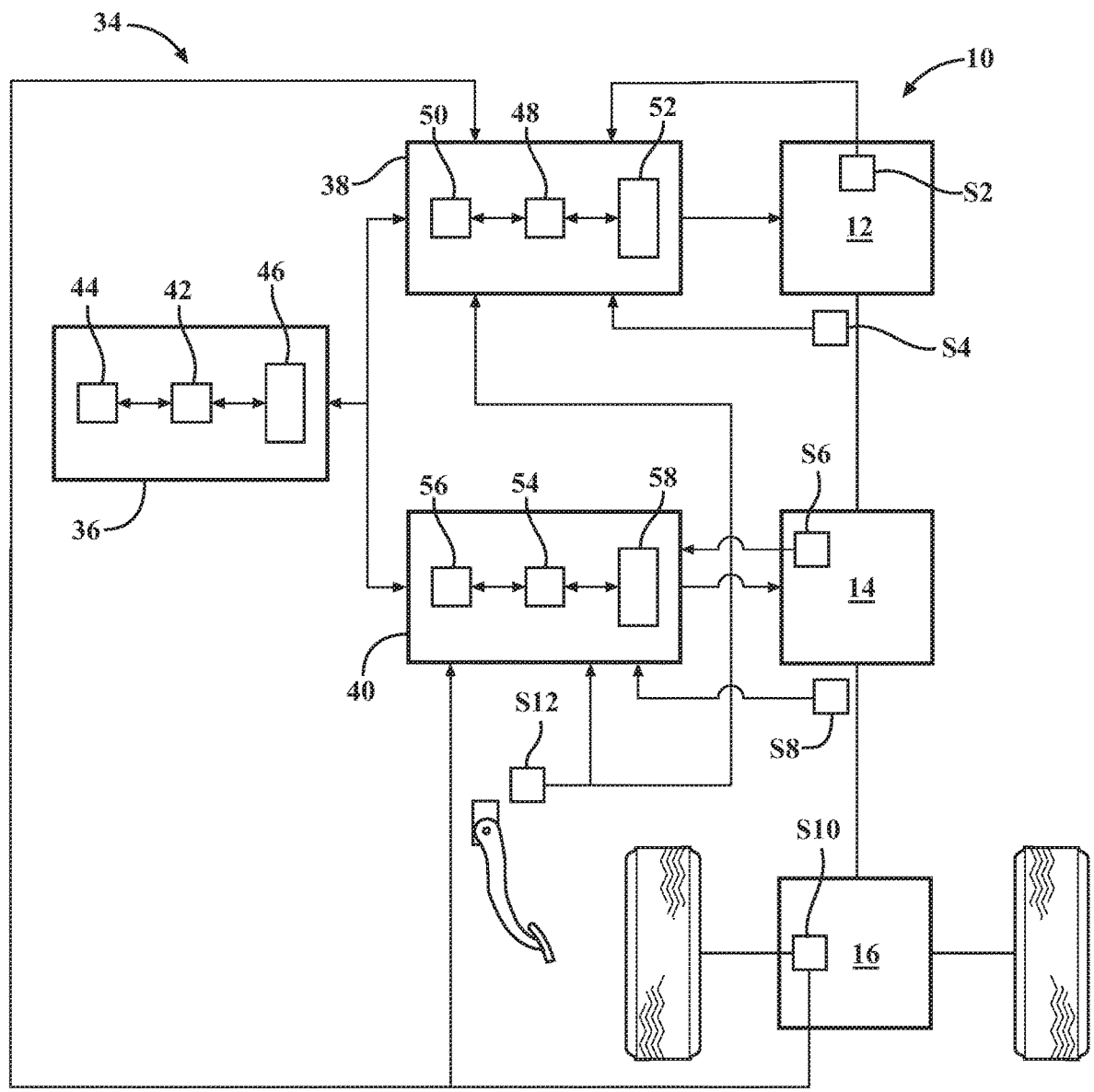
FIG. 2 is a schematic diagram showing a control system for controlling the propulsion system shown in FIG. 1, according to the principles of the present disclosure.

Turning now to FIG. 2, a vehicle propulsion control system for controlling the exemplary propulsion system 10 is generally indicated by reference number 34. The vehicle propulsion control system 34 includes a supervisory control module 36 in electronic communication with an engine control module 38 and a transmission control module 40. The control modules 36, 38, and 40 may communicate through a vehicle network or cable area network (CAN) bus. The vehicle propulsion control system 34 may include or communicate with various other control modules, such as a body control module or infotainment control module. In some variations, the supervisory control module 36 may be subsumed within the engine control module 38 or transmission control module 40.

The supervisory control module 36 is a non-generalized, electronic control device having a preprogrammed digital computer or processor 42, memory or non-transitory computer readable medium 44 used to store data such as control logic, instructions, image data, lookup tables, etc., and a plurality of input/output peripherals or ports 46. The processor 42 is configured to execute the control logic or instructions.

The engine control module 38 is a non-generalized, electronic control device having a preprogrammed digital computer or processor 48, memory or non-transitory computer readable medium 50 used to store data such as control logic, instructions, image data, lookup tables, etc., and a plurality of input/output peripherals or ports 52. The processor 48 is configured to execute the control logic or instructions. The engine control module 38 communicates with, and controls, the engine 12.

The transmission control module 40 is a non-generalized, electronic control device having a preprogrammed digital computer or processor 54, memory or non-transitory computer readable medium 56 used to store data such as control logic, instructions, image data, lookup tables, etc., and a plurality of input/output peripherals or ports 58. The processor 54 is configured to execute the control logic or instructions. The transmission control module 40 communicates with, and controls, the transmission 14.

The vehicle propulsion control system 34 communicates with a plurality of sensors connected to the propulsion system 10 including an air flow sensor S2 in the engine 12, an engine speed sensor S4, a transmission input shaft speed sensor S6, a transmission output shaft speed sensor S8, a vehicle speed sensor S10, and a pedal position sensor S12. The air flow sensor S2 and the engine speed sensor S4 communicate with the engine control module 38. The transmission input shaft speed sensor S6 and the transmission output shaft speed sensor S8 communicate with the transmission control module 40. The vehicle speed sensor S10 and the pedal position sensor S12 communicate with both the engine control module 38 and the transmission control module 40.

Figure 3:
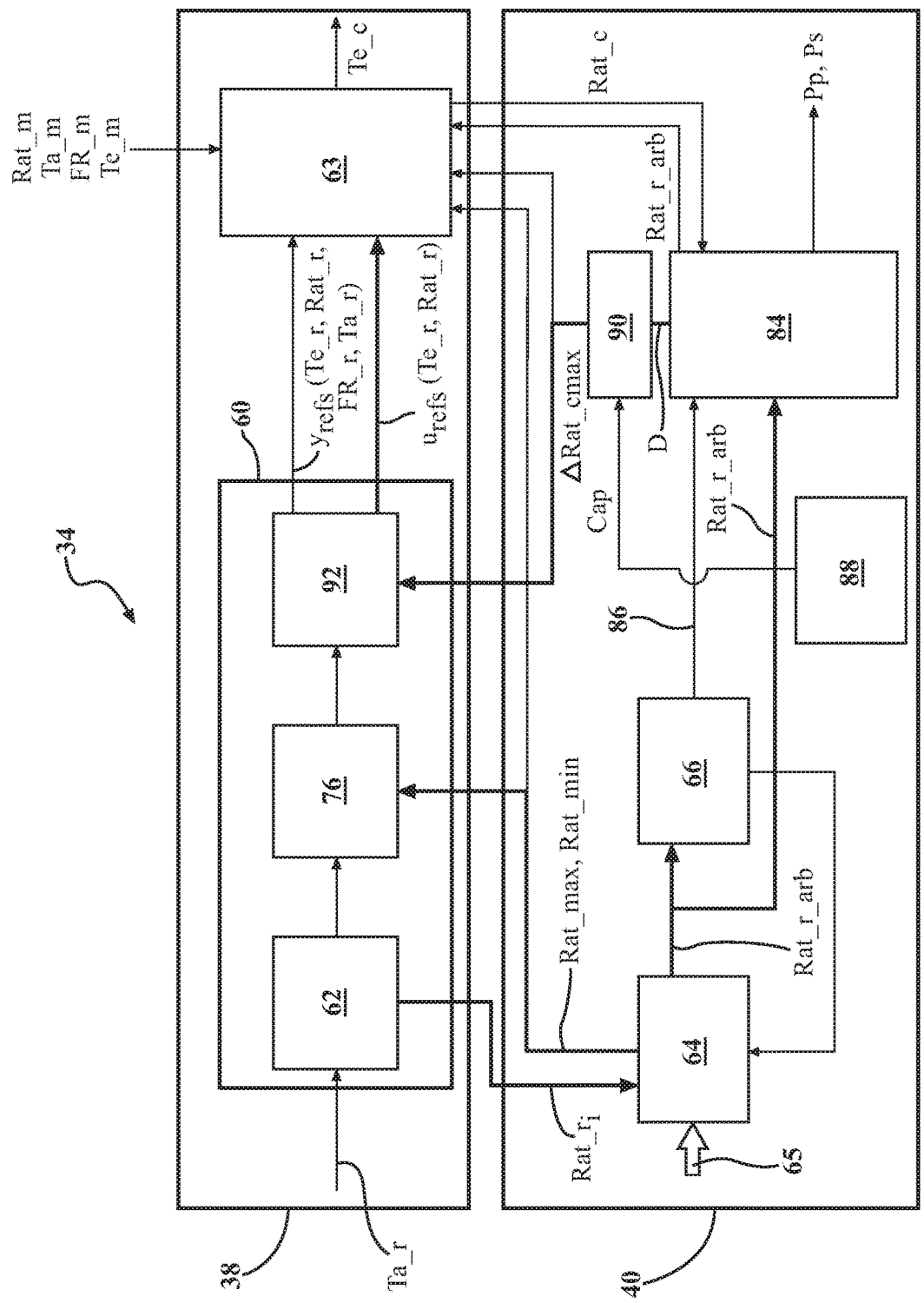
FIG. 3 is a schematic diagram showing additional details of the control system shown in FIG. 2, in accordance with the principles of the present disclosure.

With reference to FIG. 3, and continued reference to FIGS. 1 and 2, additional details of the propulsion control system 34, including the engine control module 38 and the transmission control module 40, are illustrated. In this example, the engine control module includes a reference generator module 60. The reference generator module 60 may be, for example, a steady state optimizer configured to determine reference values (desired or requested values) used for determining "u" variables (controlled variables) and "y" variables (optimized output variables that may be tracked). For example, the reference generator 60 may be configured to determine a requested engine output torque Te_r, an initial requested transmission ratio Rat_$r_i$ (which may be a transmission speed ratio), a requested fuel consumption rate FR_r, and a requested axle torque Ta_r.

The requested axle torque Ta_r may be determined as a function of accelerator pedal position and vehicle speed. More particularly, the requested axle torque Ta_r may be determined based on the accelerator pedal position PP and the vehicle speed V with a relationship such as:

$$Ta\_r = f(PP, V). \tag{1}$$

In some examples, the requested axle torque Ta_r may be determined from a lookup table or 2D map from a vehicle speed V sensed by vehicle speed sensor S10 and an accelerator pedal position PP sensed by the pedal position sensor S12. In other cases, the requested axle torque Ta_r may be determined based on interventions, such as a brake torque management (BTM) request, a vehicle overspeed condition request, a traction control (TC) request, a deceleration fuel cut off request, a shaping request, a chassis system request, a performance launch request, a four-wheel drive request, and/or an emergency autonomous braking request.

The requested fuel consumption rate FR_r may be determined based on the requested axle torque Ta_r, the vehicle speed V, the engine speed RPM, and the air-fuel ratio AF. For example, $$FR\_r = f(Ta\_r, V, RPM, AF). \quad (2)$$

The engine speed RPM may be determined from the engine speed sensor S4. The air-fuel ratio AF is the ratio of the mass of air to the mass of fuel, which may be reported by a fuel control module, by way of example.

The initial requested transmission ratio Rat_r$_i$ may be determined in a base ratio map module 62 of the reference generator 60, for example, based on the requested axle torque Ta_r and the vehicle speed V, by applying predetermined base ratio map. For example, $$Rat\_r_i = f(Ta\_r, V) \quad (3)$$

where Rat_r$_i$ is the initial requested transmission ratio, a transmission speed ratio, determined by the base ratio map module 62.

The reference values generated by the reference generator 60 include u$_{refs}$ and the y$_{refs}$ that are output to an MPC module 63 that optimizes the trajectory, particularly of the fuel consumption rate FR, during the transient from one steady state to another. The u$_{refs}$ may include the requested engine output torque Te_r and the initial requested transmission ratio Rat_r$_i$ while the y$_{refs}$ may include all four of the requested engine output torque Te_r, the initial requested transmission ration Rat_r$_i$ the requested fuel consumption rate FR_r, and the requested axle torque Ta_r. In some circumstances, another requested transmission ratio Ta_r will be used in place of the initial requested transmission ratio Rat_r$_i$ which will be described in further detail below.

The MPC module 63 is described in further detail below, but essentially, the MPC module 63 is configured to generate a plurality of sets of possible command values, including a possible commanded transmission ratio, and determine a cost for each set of possible command values. The MPC module 63 determines which set of possible command values of the plurality of sets of possible command values has a lowest cost and selects the set of possible command values that has the lowest cost to define a set of selected command values including an MPC-selected commanded transmission ratio. To arrive at the lowest cost, fuel consumption may be minimized, so that the MPC-selected transmission ratio is a transmission ratio capable of implementing the required engine and axle torques while minimizing fuel consumption.

However, in some circumstances, it may not be desirable to minimize fuel consumption at the expense of another parameter, such as transmission ratio. Therefore, the transmission control module 40 implements constraints over the possible transmission ratio, based on a range of factors, including drivability factors. In some circumstances, as will be described in further detail below, the transmission control module 40 takes control from the MPC module 63 and determines the transmission ratio to be applied.

To this end, the initial requested transmission ratio Rat_r$_i$ is output from the base ratio map module 62 of the reference generator 60 to a constraints module 64 in the transmission control module 40. The constraints module 64 is configured to determine a maximum transmission ratio Rat$_{max}$ and a minimum transmission ratio Rat$_{min}$ based on a plurality of override inputs 65.

The override inputs 65 may include, by way of non-limiting example, a tap-up tap-down input (TUTD) or a manual-up manual-down input (MUMD) originating with a driver, adjustment for engine temperature, adjustment for transmission temperature, selection of a driving mode (such as a sport driving mode or a winter driving mode), implementation of a reverse direction, implementation of a sawtooth ratio mode (wherein the CVT mimics a stepped transmission when making ratio changes), transmission-in-service override (e.g., for when it is desired to run calibration, testing, or service on the transmission), a default, an altitude offset, a heater performance adjustment, detection of pedal instability, implementation of a ratio hold while a driver's foot is lifted (typically used in a sport driving mode), downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, engine overspeed protection, and output speed range.

The above are all examples of override inputs 65, whereby it may be desirable to set upper and/or lower constraints for selecting the transmission ratio. The constraints module 64 determines an arbitrated requested transmission ratio Rat_r_arb based on applying the maximum transmission ratio Rat$_{max}$ and the minimum transmission ratio Rat$_{min}$ to the initial requested transmission ratio Rat_r$_i$. The arbitrated requested transmission ratio Rat_r_arb is then output to a takeover module 66. In this example, the arbitrated requested transmission ratio Rat_r_arb may be a speed ratio, but in the alternative, a torque ratio (inverse of the speed ratio) may be used.

The takeover module 66 is configured to determine whether the arbitrated requested transmission ratio Rat_r_arb is in a takeover range. The takeover range may include a performance shift portion and a non-performance shift portion, but the result of the arbitrated requested transmission ratio Rat_r_arb being in the takeover range is that the transmission control module 40 takes over control of determining the transmission ratio to be applied to the transmission 14. Though the takeover module 66 is illustrated as being separate from the constraints module 64, the two may be combined, if desired.

Figure 4:
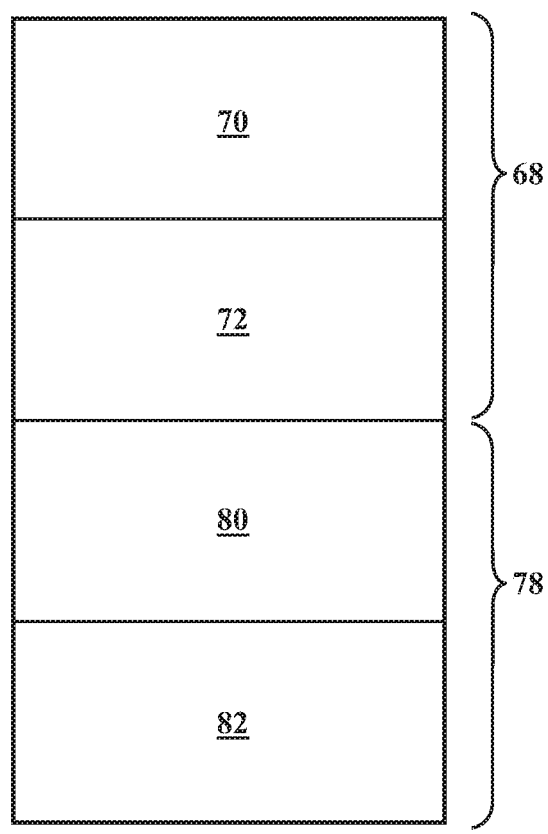
FIG. 4 is a schematic diagram illustrating further additional details of the control system shown in FIGS. 2-3, according to the principles of the present disclosure.

Referring now to FIG. 4, a schematic representation of the various ranges for the arbitrated requested transmission ratio Rat_r_arb and the maximum and minimum transmission ratios Rat$_{max}$, Rat$_{min}$, as determined by the constraints module 64, is shown. An MPC-control range 68 includes an unrestricted portion 70 and a partially restricted portion 72, and a takeover range 78 includes a non-performance shift portion 80 and a performance shift portion 82.

In the unrestricted portion 70 of the MPC-control range 68, the constraints module 64 is configured to determine the maximum transmission ratio Rat$_{max}$ as being equal to a variator maximum ratio and the minimum transmission ratio Rat$_{min}$ as being equal to a variator minimum ratio. In other words, based on considering the plurality of override inputs 65, the constraints module 64 determines that no restrictions should be placed on the maximum and minimum ratios that are possible using the variator 24a of the CVT 14. Thus, in the unrestricted portion 70, the maximum transmission ratio Rat$_{max}$ is determined to be the maximum variator ratio, and the minimum transmission ratio $Rat_{min}$ is determined to be the variator minimum ratio (both are determined by the pulley geometry as well as the system's (pulleys and chain) input torque and applied pulley clamping forces).

In the partially restricted portion 72 of the MPC-control range 68, the constraints module 64 may be configured to determine the maximum transmission ratio $Rat_{max}$ as being equal to a variator maximum ratio plus an offset and the minimum transmission ratio $Rat_{min}$ as being equal to a variator minimum ratio plus an offset. The offsets may be the same or different and may be determined based on certain of the override inputs 65. For example, in the partially restricted portion 72, the offset(s) may be determined based on a manual-up manual-down input (MUMD) originating with a driver, a MUMD hot mode, a certain output speed, hardware limits, ratio limiting overrides, or under any other desired criteria. In such a situation, the MPC module 63 will still be used to determine the transmission ratio to ultimately be applied to the variator 24a, but a set of maximum and minimum allowable transmission ratios $Rat_{max}$, $Rat_{min}$ that are more restrictive than the entire possible variator range will be output from the constraints module 64 to be used by the MPC module 63 to determine the transmission ratio (speed ratio or torque ratio) to be applied to the variator 24a.

In either portion 70, 72 of the MPC-control range 68, the MPC module 63 is used to determine the transmission ratio to be applied to the variator 24a. The maximum transmission ratio constraint $Rat_{max}$ and the minimum transmission ratio constraint $Rat_{min}$ determined by the constraints module 64 in either portion 70, 72 of the MPC-control range 68 are output to the reference generator module 60 and collected by a constraint-application module 76.

As stated above, the takeover range 78 for the maximum transmission ratio $Rat_{max}$, the minimum transmission ratio $Rat_{min}$, and the arbitrated requested transmission ratio Rat_r_arb includes a non-performance shift portion 80 and a performance shift portion 82. In both portions of the takeover range 78, the constraints module 64 may be configured to set the arbitrated requested transmission ratio Rat_r_arb as being equal to the maximum transmission ratio $Rat_{max}$ and the minimum transmission ratio $Rat_{min}$. Therefore, the maximum transmission ratio $Rat_{max}$ and the minimum transmission ratio $Rat_{min}$ are also set equal to each other. In other words, a specific transmission ratio is set, with no room for variation within a window.

In the non-performance shift portion 80 of the takeover range 78, the constraints module 64 may be configured to determine the maximum and minimum transmission ratios $Rat_{max}$, $Rat_{min}$, as well as the arbitrated requested transmission ratio Rat_r_arb, as being equal to the initial requested transmission ratio Rat_r_i (based on the base ratio map) plus an offset. The offset may be determined based on certain of the override inputs 65. For example, in the non-performance portion 80 of the takeover range 78, the offset may be determined based on detection or selection of an uphill and/or downhill driving mode, neutral tracking, a detection of a change in driver intent, detection of a busy foot driving condition, brake compensation (e.g., when a driver is braking often, such as down a hill), implementing transmission braking, or under any other desired criteria. In such a situation, the transmission control module 40 will take over (from the MPC module 63) determination of the transmission ratio to ultimately be applied to the variator 24a.

In the performance shift portion 82 of the takeover range 78, the constraints module 64 may be configured to determine the maximum and minimum transmission ratios $Rat_{max}$, $Rat_{min}$, as well as the arbitrated requested transmission ratio Rat_r_arb, as being equal to a performance shift ratio. The performance shift ratio may be completely determined by programming or calibration into the transmission control module 40, such as by a special ratio map designed for performance shifting or when driver demand dictates a significant change in the ratio obtained from the ratio map. The performance shift ratio may be determined or selected based on certain of the override inputs 65. For example, in the performance shift portion 82 of the takeover range 78, the performance shift ratio (and thus the arbitrated requested transmission ratio Rat_r_arb) may be determined based on detection or selection of a driving mode (such as a performance or sport driving mode), a device control or a transmission-in-service override, a hot or cold mode, a tap-up tap-down input (TUTD) including a temporary tap (such as without moving the PRNDL device), a panic stop, implementation of a sawtooth ratio mode (to mimic a stepped transmission), a manual-up manual-down input (MUMD) in conjunction with a sawtooth mode, to provide control for ratio drift, or under any other desired criteria. In such a situation, the transmission control module 40 will take over (from the MPC module 63) determination of the transmission ratio and implement the performance shift ratio within the variator 24a.

The takeover module 66 may feed back information to the constraints module 66 about whether the TCM 40 will take over control of determining the transmission ratio. Such control information may also be sent to the ECM 38.

When the maximum and minimum transmission ratios $Rat_{max}$, $Rat_{min}$ and the arbitrated requested transmission ratio Rat_r_arb are within the MPC-controlled range 68, the maximum and minimum transmission ratios $Rat_{max}$, $Rat_{min}$ are used by the reference generator 60 and/or the MPC module 63 to limit the ultimate commanded transmission ratio to value higher than $Rat_{min}$ and lower than $Rat_{max}$.

As stated above, the reference generator 60 is also configured to determine a requested engine output torque Te_r. The requested engine output torque Te_r may be determined based on the requested axle torque Ta_r, the initial requested transmission ratio Rat_r_i and the final drive ratio FD (which is constant for a given vehicle). For example, $$\text{Te\_r} = \frac{\text{Ta\_r} + \text{Loss}}{\text{Rat\_ri} * FD}. \quad (4)$$

The "loss" factor may encompass mechanical losses, such as friction and pulley clamping losses, pump losses, spin losses, by way of example. Once the requested values, or reference values, are determined, the reference generator 60 outputs them (the $u_{refs}$ and the $y_{refs}$) to the MPC module 63. The MPC module 63 uses model predictive control and may also be referred to as a quadratic programming solver, such as a Dantzig QP solver.

The MPC module 63 is a multivariable control module that may iteratively control engine output torque and transmission ratio to optimize a fuel consumption rate FR and to achieve a desired axle torque. The axle torque is the amount of torque at the vehicle axle 30. Inputs to the MPC module 63 include a measured actual axle torque Ta_m, a measured actual fuel consumption rate FR_m, a measured actual transmission ratio Rat_m, and a measured actual engine output torque Te_m. These "measured" values may be measured directly or computed, determined, or estimated, and are a representation of an actual parameter.

Outputs of the MPC module 63 may include a selected commanded engine output torque Te_c and a commanded transmission ratio Rat_c. These controlled outputs, or "u" variables (Te_c and Rat_c), of the MPC module 63 may be inputs to the engine 12 and transmission 14. For example, the commanded transmission ratio Rat_c is output to a ratio control module 84 in the TCM 40.

The ratio control module 84 is configured to set and implement an ultimate commanded transmission ratio as the MPC-selected commanded transmission ratio Rat_c if the arbitrated requested transmission ratio Rat_r_arb is in an MPC-control range 68. However, if the arbitrated requested transmission ratio Rat_r_arb is in the takeover range 78, the ratio control module 84 is configured to set and implement the ultimate commanded transmission ratio based on the arbitrated requested transmission ratio Rat_r_arb as determined within the TCM 40. The ratio control module 84 is then configured to command pressures Pp and Ps to the variator assembly 24a that is configured to implement the ultimate commanded transmission ratio, wherein Pp is the pressure commanded to the primary pulley assembly 24b and Ps is the pressure commanded to the secondary pulley assembly 24c. Thus, the ultimate commanded transmission ratio is used to control the transmission 14 to provide an actual pulley ratio between the transmission input shaft 22 and the transmission output shaft 26.

The MPC module 63 also outputs the selected commanded engine output torque Te_c to control the engine 12 to result in an actual engine output torque. The transmission 14 and engine 12 can together be called the "plant" that is controlled by the control system 34. The plant outputs the "y" variables, the values that may be tracked, which may include the actual measured engine output torque Te_m, the actual measured fuel consumption rate FR_m, the actual measured transmission ratio (or pulley ratio) Rat_m, and the actual measured axle torque Ta_m.

The MPC module 63 works by predicting the actual axle torque and the actual fuel consumption rate. The prediction portion of the MPC module 63 may also be referred to as a state observer, which uses a Kalman filter. The prediction portion of the MPC module 63 is configured to generate a plurality of predicted actual axle torques and fuel consumption rates. For example, the prediction portion generates a plurality of predicted values including at least a first predicted actual axle torque and a first predicted actual fuel consumption rate based on a first set of possible command values (which may be generated, for example, by a command generator module), where the first set of possible command values includes a first commanded engine output torque Te_c and a first commanded transmission ratio Rat_c. The prediction portion is further configured to generate at least a second predicted actual axle torque and a second predicted actual fuel consumption rate based on a second set of possible command values, where the second set of possible command values includes a second commanded engine output torque Te_c and a second commanded transmission ratio Rat_c. In practice, a much larger number of predicted values may be generated based on additional sets of possible command values (third, fourth, fifth, etc. sets of possible Te_c and Rat_c values).

The MPC module 63 further contains a cost module portion that is configured to determine a first cost for the first set of possible command values Te_c, Rat_c based on at least first and second predetermined weighting values, the first predicted actual axle torque, the first predicted actual fuel consumption rate, the requested axle torque Ta_r, the requested engine output torque Te_r, the requested transmission ratio Rat_r (which may be Rat_r_i or Rat_r_arb), and the requested fuel consumption rate FR_r. Similarly, the cost module portion is configured to determine a second cost for the second set of possible command values Te_c, Rat_c based on at least the first and second predetermined weighting values, the second predicted actual axle torque, the second predicted actual fuel consumption rate, the requested axle torque Ta_r, the requested engine output torque Te_r, the requested transmission ratio Rat_r, and the requested fuel consumption rate FR_r. Likewise, many more additional costs may be determined based on additional sets of predicted values and command values, to optimize for the lowest cost.

The MPC module 63 may also include a selection module portion configured to select one of the plurality of sets of possible command values Te_c, Rat_c based on the lowest of the determined costs and set a selected engine output torque Te_c and a selected transmission ratio Rat_c equal to, or based on, the possible command values Te_c, Rat_c of the selected one of the plurality of possible sets.

In cases in which the ultimate commanded transmission ratio is determined by the TCM 40, and not the MPC module 63, the MPC module 63 may still be used to determine the cost, and thus the selected command value for engine output torque Te_c. In such a case, the actual commanded transmission ratio is used by the MPC module 63 to determine the desirable engine output Te_c to command for transmission ratios in the takeover range 78. Thus, Rat_r_arb is input into the MPC module 63 as Rat_r and Rat_c to determine Te_c, in the takeover range 78.

The cost module portion may be configured to determine the plurality of costs, with the following cost equation (5):

$$\text{Cost} = \sum (y(i|k) - y_{ref})^T Q_Y (y(i|k) - y_{ref}) + \qquad (5)$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} Te\_a \\ FR\_a \\ Rat\_a \\ Ta\_a \end{bmatrix}$$

$$y_{ref} = \begin{bmatrix} Te\_r \\ FR\_r \\ Rat\_r \\ Ta\_r \end{bmatrix}$$

$$u = \begin{bmatrix} Te\_c \\ Rat\_c \end{bmatrix}$$

$$u_{ref} = \begin{bmatrix} Te\_r \\ Rat\_r \end{bmatrix}$$

where Te_a=predicted actual engine output torque; FR_a=predicted actual fuel consumption rate; Rat_a=predicted actual transmission ratio; Ta_a=predicted actual axle torque; Te_r=requested engine output torque; FR_r=requested fuel consumption rate; Rat_r=requested transmission ratio (may be Rat_r_i (in the MPC-controlled range 68) or Rat_r_arb (in the takeover range 78)); Ta_r=requested axle torque; Te_c=possible commanded engine output torque; Rat_c=possible commanded transmission ratio (in the MPC-controlled range 68) or the ultimate commanded transmission ratio (in the takeover range 78, which is also equal to Rat_r_arb in the takeover range 78); $Q_y$=a first predetermined weighting value; $Q_u$=a second predetermined weighting value; $Q_{\Delta u}$=a third predetermined weighting value; i=index value; k=prediction step; and T=transposed vector. In this case, there are two values for the "u" variables, $u_1$ and $u_2$, such that i=1, 2, and there may be four values for the "y" variables, $y_1$, $y_2$, $y_3$, $y_4$, such that i=1, 2, 3, 4. As explained above, the $y_{ref}$ and $u_{ref}$ values may be determined by the reference generator 60, except that Rat_r may be determined by the constraints module 64 in the takeover range 78.

The plurality of costs may be determined even more particularly with the following equation (6), which is an MPC equation having a prediction horizon of three and a control horizon of two:

$$\text{Cost} = \{\lambda_a*(Ta\_a_k-Ta\_r)^2 + \lambda_a*(Ta\_a_{k+1}-Ta\_r)^2 + \lambda_a* \\ (Ta\_a_{k+2}-Ta\_r)^2\} + \{\Delta_f*(FR\_a_k-FR\_r)^2 + \lambda_f* \\ (FR\_a_{k+1}-FR\_r)^2\} + *(FR\_a_{k+2}-FR\_r)^2 + \{\lambda_e* \\ (Te\_c_k-Te\_r)^2 + \lambda_e*(Te\_c_{k+1}-Te\_r)^2\} + \{\lambda_r* \\ (Rat\_c_k-Rat\_r)^2 + \lambda_r*(Rat\_c_{k+1}-Rat\_r)^2\} + \{\lambda_{\Delta r}* \\ (\Delta Rat\_c_k)^2 + \lambda_{\Delta r}*(\Delta Rat\_c_{k+1})^2\} + \{\lambda_{\Delta e}*(\Delta Te\_c_k)^2 + \\ \lambda_{\Delta e}*(\Delta Te\_c_{k+1})^2\} \quad (6)$$

where $\lambda_a$=a first predetermined weighting value; $Ta\_a_k$=predicted actual axle torque at a prediction step k; Ta_r=requested axle torque requested; $Ta\_a_{k+1}$=predicted actual axle torque at a prediction step k+1; $Ta\_a_{k+2}$=predicted actual axle torque at a prediction step k+2; $\lambda_f$=a second predetermined weighting value; $FR\_a_k$=predicted actual fuel consumption rate at the prediction step k; FR_r=requested fuel consumption rate; $FR\_a_{k+1}$=predicted actual fuel consumption rate at the prediction step k+1; $FR\_a_{k+2}$=predicted actual fuel consumption rate at the prediction step k+2; $\lambda_e$=a third predetermined weighting value; $Te\_c_k$=commanded engine output torque at the prediction step k; Te_r=requested engine output torque; $Te\_c_{k+1}$=commanded engine output torque at the prediction step k+1; $\lambda_r$=a fourth predetermined weighting value; $Rat\_c_k$=commanded transmission ratio at the prediction step k (in the MPC-controlled range 68) or the ultimate commanded transmission ratio (in the takeover range 78, which is also equal to Rat_r_arb in the takeover range 78); Rat_r=requested transmission ratio (may be $Rat\_r_i$ (in the MPC-controlled range 68) or Rat_r_arb (in the takeover range 78)); $Rat\_c_{k+1}$=may be commanded transmission ratio at the prediction step k+1 (in the MPC-controlled range 68) or the ultimate commanded transmission ratio (in the takeover range 78); $\lambda_{\Delta r}$=a fifth predetermined weighting value; $\Delta Rat\_c_k$=change in commanded transmission ratio at the prediction step k (in the MPC-controlled range 68) or change in the ultimate transmission ratio (in the takeover range 78); $\Delta Rat\_c_{k+1}$=change in commanded transmission ratio at the prediction step k+1 (in the MPC-controlled range 68) or change in the ultimate transmission ratio (in the takeover range 78); $\lambda_{\Delta e}$=a sixth predetermined weighting value; $\Delta Te\_c_k$=change in commanded engine output torque at the prediction step k; and $\Delta Te\_c_{k+1}$=change in commanded engine output torque at the prediction step k+1. The prediction step k is the prediction at a current step, the prediction step k+1 is a prediction one step ahead, and the prediction step k+2 is a prediction two steps ahead. As explained above, the $y_{ref}$ and $u_{ref}$ values may be determined by the reference generator 60, except that Rat_r may be determined by the constraints module 64 in the takeover range 78.

The cost equation (e.g., equation (5) or (6)) may be applied iteratively to arrive at the lowest cost for a plurality of sets of possible command values Te_c, Rat_c. Then, the MPC module 63 may select the set of possible command values Te_c, Rat_c of the plurality of command values having the lowest cost, where the set of possible command values Te_c, Rat_c having the lowest cost may be defined as the selected set, including the selected transmission ratio Rat_c and the selected engine output torque Te_c. For arbitrated requested transmission ratios Rat_r_arb in the MPC-controlled range 68, the selected Rat_c is chosen as the ultimate commanded transmission ratio used by the ratio control module 84; however, for arbitrated requested transmission ratios Rat_r_arb in the takeover range 68, the arbitrated requested transmission ratio Rat_r_arb or another TCM-generated transmission ratio is chosen as the ultimate commanded transmission ratio used by the ratio control module 84.

The prediction portion of the MPC module 63 may provide a number of predicted actual values for use in the cost equation (e.g., equation (5) or (6)). The prediction portion may use equations such as the following to determine the predicted actual values:

$$y_k = C * x_k + w \quad (7)$$

$$y_{k+1} = C * x_{k+1} + w \quad (8)$$

$$x_{k+1} = A * x_k + B * u_k + v + K_{KF} * (y_k - y_{mk}) \quad (9)$$

$$y_k = \begin{bmatrix} Te\_a_k \\ FR\_a_k \\ Rat\_a_k \\ Ta\_a_k \end{bmatrix}$$

$$y_{k+1} = \begin{bmatrix} Te\_a_{k+1} \\ FR\_a_{k+1} \\ Rat\_a_{k+1} \\ Ta\_a_{k+1} \end{bmatrix}$$

$$u_k = \begin{bmatrix} Te\_c_k \\ Rat\_c_k \end{bmatrix}$$

$$y_{mk} = \begin{bmatrix} Te\_a\_m_k \\ FR\_a\_m_k \\ Rat\_a\_m_k \\ Ta\_a\_m_k \end{bmatrix}$$

where A=a state (or transmission) matrix; B=an input matrix; C=an output (or measured) matrix; $Te\_a_k$=predicted actual engine output torque at the prediction step k; $FR\_a_k$=predicted actual fuel consumption rate at the prediction step k; $Rat\_a_k$=predicted actual transmission ratio at the prediction step k; $Ta\_a_k$=predicted actual axle torque at the prediction step k; $x_k$=state variable at a prediction step k; $Te\_a_{k+1}$=predicted actual engine output torque at the prediction step k+1; $FR\_a_{k+1}$=predicted actual fuel consumption rate at the prediction step k+1; $Rat\_a_{k+1}$=predicted actual transmission ratio at the prediction step k+1; $Ta\_a_{k+1}$=predicted actual axle torque at the prediction step k+1; $x_{k+1}$=state variable at a prediction step k+1; $Te\_c_k$=possible commanded engine output torque at the prediction step k; $Rat\_c_k$ may be either possible commanded transmission ratio at the prediction step k (in the MPC-selected range 68) or the ultimate commanded transmission ratio (for the TCM takeover range 78); $K_{KF}$=a Kalman filter gain; $Te\_a\_m_k$=measured engine output torque at the prediction step k; $FR\_a\_m_k$=measured fuel consumption rate at the prediction step k; $Rat\_a\_m_k$=measured transmission ratio at the prediction step k; $Ta\_a\_m_k$=measured axle torque at the prediction step k; v=process noise; and w=measurement noise. The prediction step k is a prediction step at the current time (e.g., now), and the prediction step k+1 is a prediction one step ahead.

Measured engine output torque Te_a_m may be determined or estimated based on signals from the engine speed sensor S4 and/or other sensors. The measured transmission ratio, or pulley ratio, Rat_a_m may be determined from the speed of the transmission input shaft 22 sensed by the transmission input shaft speed sensor S6 and the speed of the transmission output shaft 26 sensed by the transmission output shaft speed sensor S8, and may be provided by the TCM 40.

Ta_$a_{k+1}$ and FR_$a_{k+1}$ may be defined as or equal to the first predicted actual axle torque and the first predicted actual fuel consumption rate, respectively, when generated based on the first set of possible command values for Te_$c_k$ and Rat_$c_k$, and Ta_$a_{k+1}$ and FR_$a_{k+1}$ may be defined as or equal to the second predicted actual axle torque and the second predicted actual fuel consumption rate, respectively, when generated based on the second set of possible command values for Te_$c_k$ and Rat_$c_k$, and so on.

The cost equation (e.g., equation (5) or (6)) may be subject to the following constraints:

Te$_{min}$≤Te_$c_k$≤Te$_{max}$;
Te$_{min}$≤Te_$c_{k+1}$≤Te$_{max}$;
Rat$_{min}$≤Rat_$c_k$≤Rat$_{max}$;
Rat$_{min}$≤Rat_$c_{k+1}$≤Rat$_{max}$;
ΔRat$_{min}$≤ΔRat_$c_k$≤ΔRat$_{max}$;
ΔRat$_{min}$≤ΔRat_$c_{k+1}$≤ΔRat$_{max}$;
ΔTe$_{min}$≤ΔTe_$c_k$≤Te$_{max}$; and
ΔTe$_{min}$≤ΔTe$_{k+1}$≤ΔTe$_{max}$, where Te$_{min}$=a minimum possible engine output torque, Te$_{max}$=a maximum possible engine output torque, Rat$_{min}$=a minimum possible transmission ratio, Rat$_{max}$=a maximum possible transmission ratio, ΔRat$_{min}$=a minimum possible rate of change in transmission ratio; ΔRat$_{max}$=a maximum possible rate of change in transmission ratio, ΔTe$_{min}$=a minimum possible rate of change in engine output torque, and ΔTe$_{max}$=a maximum possible rate of change in engine output torque. As mentioned above, Rat$_{min}$ and Rat$_{max}$ may be determined by the constraints module 64.

The constants, matrices, and gain referred to above, including A, B, C, $K_{KF}$, $Q_y$, $Q_u$, $Q_{\Delta u}$, $\lambda_e$, $\lambda_r$, $\lambda_{\Delta e}$, $\lambda_{\Delta r}$, are parameters of the system determined through testing, physical models, or other means. In some variations, a system identification procedure is run offline, for example, during a calibration, to identify the constants, matrices, and gain, and also to define $u_0$ and $y_0$. Once $u_0$ and $y_0$ are known, then $x_0$ can be computed from the prediction module equations (e.g., equations (7)-(9) or a subset thereof). Thereafter, each of the MPC equations (e.g., equations (5)-(9) or a subset thereof) can be run to obtain initial values offline. Then, the MPC module 63 can be run online to constantly optimize the controlled parameters Te_c and Rat_c as the vehicle 9 is running through steady state and transient states. The constants allow the cost to be determined based on the relationship between and relative importance of each of the commanded values Te_c, Rat_c and tracked values (e.g., FR_a, Ta_a, Rat_a, Te_a). The relationships are weighted to control the effect that each relationship has on the cost.

In some forms, the MPC module 63 may generate the possible sets of command values Te_c, Rat_c by determining possible sequences, sets, or a surface containing the command values Te_c, Rat_c that could be used for N future control loops. Predicted responses to the possible sets of the command values Te_c, Rat_c may be determined with equations (7)-(9) or a subset thereof. For example, set of predicted actual axle torques Ta_a and a set of predicted actual fuel consumption rates FR_a may be determined for N control loops. More particularly, a set of N values for each command value Te_c, Rat_c may be determined, and a set of M values for each predicted actual value Ta_a, FR_a may be determined based on the N command values Te_c, Rat_c. The cost may then be determined for each of the possible sets of command values Te_c, Rat_c based on the predicted actual parameters Ta_a, FR_a (which may include Ta_$a_k$, Ta_$a_{k+1}$, Ta_$a_{k+2}$, FR_$a_k$, FR_$a_{k+1}$, and FR_$a_{k+2}$, depending on the particular cost equation (5), (6) used). One of the possible sets of the command values Te_c, Rat_c may then be selected based on the costs of the possible sets, respectively. For example, the possible set of command values Te_c, Rat_c having the lowest cost while satisfying the system constraints (e.g., Te$_{min}$<Te_$c_k$<Te$_{max}$; Te$_{min}$<Te_$c_{k+1}$<Te$_{max}$; Rat$_{min}$<Rat_$c_k$<Rat$_{max}$; Rat$_{min}$<Rat_$c_{k+1}$<Rat$_{max}$; ΔTe$_{min}$<ΔTe_$c_k$<ΔTe$_{max}$; ΔTe$_{min}$<ΔTe_$c_{k+1}$<ΔTe$_{max}$; ΔRat$_{min}$<ΔRat_$c_k$<ΔRat$_{max}$; ΔRat$_{min}$<ΔRat_$c_{k+1}$<ΔRat$_{max}$) is typically selected by the MPC module 63.

In some forms, satisfaction of the constraints may be considered in the cost determination. For example, the MPC module 63 may determine the cost values further based on the constraints and may select the possible set of command values Te_c, Rat_c that best achieves the axle torque request Ta_r while minimizing fuel consumption rate FR_a that has been determined to comply with the constraints.

During steady-state operation, the command values Te_c, Rat_c may settle at or near the reference, or requested, values Te_r, Rat_r, respectively. During transient operation, however, the MPC module 63 may adjust the command values Te_c, Rat_c away from the reference values Te_r, Rat_r in order to best achieve the torque request Ta_r, while minimizing the fuel consumption rate FR_a and satisfying the constraints.

In operation, the MPC module 63 may determine the cost values for the possible sets of controlled and predicted values (u, y). The MPC module 63 may then select the one of the possible sets having the lowest cost. The MPC module 63 may next determine whether the selected possible set satisfies the constraints. If so, the possible set may be defined as the selected set. If not, the MPC module 63 determines the set with the lowest cost that satisfies the constraints and defines that set as the selected set. The transmission ratio of the selected set becomes the ultimate commanded transmission ratio in the MPC-controlled range 68.

In the illustrated example, the MPC-selected commanded engine output torque Te_c is output to control engine torque. The control system 34 may contain an actuation module configured to control a vehicle parameter, such as acceleration of the vehicle 9, which is optimized and controlled by the MPC module 63 to optimize the fuel consumption rate. Any vehicle system that varies an engine or transmission parameter may be referred to as an actuation module. In some forms, for example, the actuation module may vary the engine spark timing or the throttle, to control vehicle acceleration and/or axle torque.

Within the TCM 40, if the takeover module 66 determines that the TCM 40 will take over control of determining the transmission ratio to command to the ratio control module 84, the takeover module 66 may pass along a signal to the ratio control module 84 indicating that the TCM 40 is taking control of ratio determination, such as along path 86. Further, the arbitrated requested transmission ratio Rat_r_arb is fed to the ratio control module 84 to implement the arbitrated requested transmission ratio Rat_r_arb as the ultimate commanded transmission ratio in the takeover range 78.

A pump capability module 88 may send information about how fast the transmission pump can execute a change in transmission ratio. The pump capability information (noted as Cap in FIG. 3) may be output to a ratio rate arbitration module 90. The ratio rate arbitration module 90 may collect information about drivability limits D, which may be fed to the ratio rate arbitration module 90 from the ratio control module 84. The drivability limits D may be a predetermined calibrated set of limits on the transmission ratio rate of change.

The ratio rate arbitration module 90 may be configured to determine the maximum transmission ratio rate of change $\Delta Rat_{max}$, which may be a maximum rate of change of the transmission speed ratio. The control system 34 may be configured to limit a change in the ultimate commanded transmission ratio based on the maximum transmission ratio rate of change $\Delta Rat_{max}$. For an upshift, the maximum transmission speed ratio rate of change $\Delta Rat_{max}$ may be determined based on the lesser of the predetermined drivability limit D and the pump flow rate capability model Cap. In the opposite direction, for a downshift, the maximum transmission speed ratio rate of change $\Delta Rat_{max}$ may be determined based on the greater of the predetermined drivability limit D and the pump flow rate capability model Cap. In the alternative the maximum transmission ratio rate of change may be described as a maximum torque ratio rate of change. In such a case, for an upshift, the maximum transmission torque ratio rate of change may be determined based on the greater of the predetermined drivability limit D and the pump flow rate capability model Cap, and in the opposite direction for a downshift, the maximum transmission torque ratio rate of change may be determined based on the lesser of the predetermined drivability limit D and the pump flow rate capability model Cap.

The maximum rate of transmission ratio change $\Delta Rat_{max}$ may then be sent to a rate-limit-application module 92 and may also be transmitted to the MPC module 63, where the maximum transmission ratio rate of change $\Delta Rat_{max}$ may be applied when determining the commanded transmission ratio Rat_c by the MPC module 63.

The maximum transmission ratio rate of change $\Delta Rat_{max}$ may be especially relevant when transitioning from the arbitrated requested transmission ratio Rat_r_arb in the takeover range 78 to the commanded transmission ratio Rat_c selected by the MPC module 63 in the MPC-controlled range 68. A change in the ultimate commanded transmission ratio is rate limited by the maximum transmission ratio rate of change $\Delta Rat_{max}$. Thus, if the system 34 transitions from commanding the arbitrated requested transmission ratio Rat_r_arb to the ratio control module 84 to commanding the commanded transmission ratio Rat_c selected by the MPC module 63, the maximum transmission ratio rate of change $\Delta Rat_{max}$ constraint will ensure a smooth transition in the ultimate commanded transmission ratio.

In other words, the ratio control module 84 is configured to transition the ultimate commanded transmission from the arbitrated requested transmission ratio to the MPC-selected commanded transmission ratio if the arbitrated requested transmission ratio changes from being in the takeover range 78 to being in the MPC-control range 68, and the control system 34 is configured to limit a change in the ultimate commanded transmission ratio based on the maximum transmission ratio rate of change $\Delta Rat_{max}$ as the ratio control module 84 transitions the ultimate commanded transmission ratio from the arbitrated requested transmission ratio to the MPC-selected commanded transmission ratio.

Figure 5:
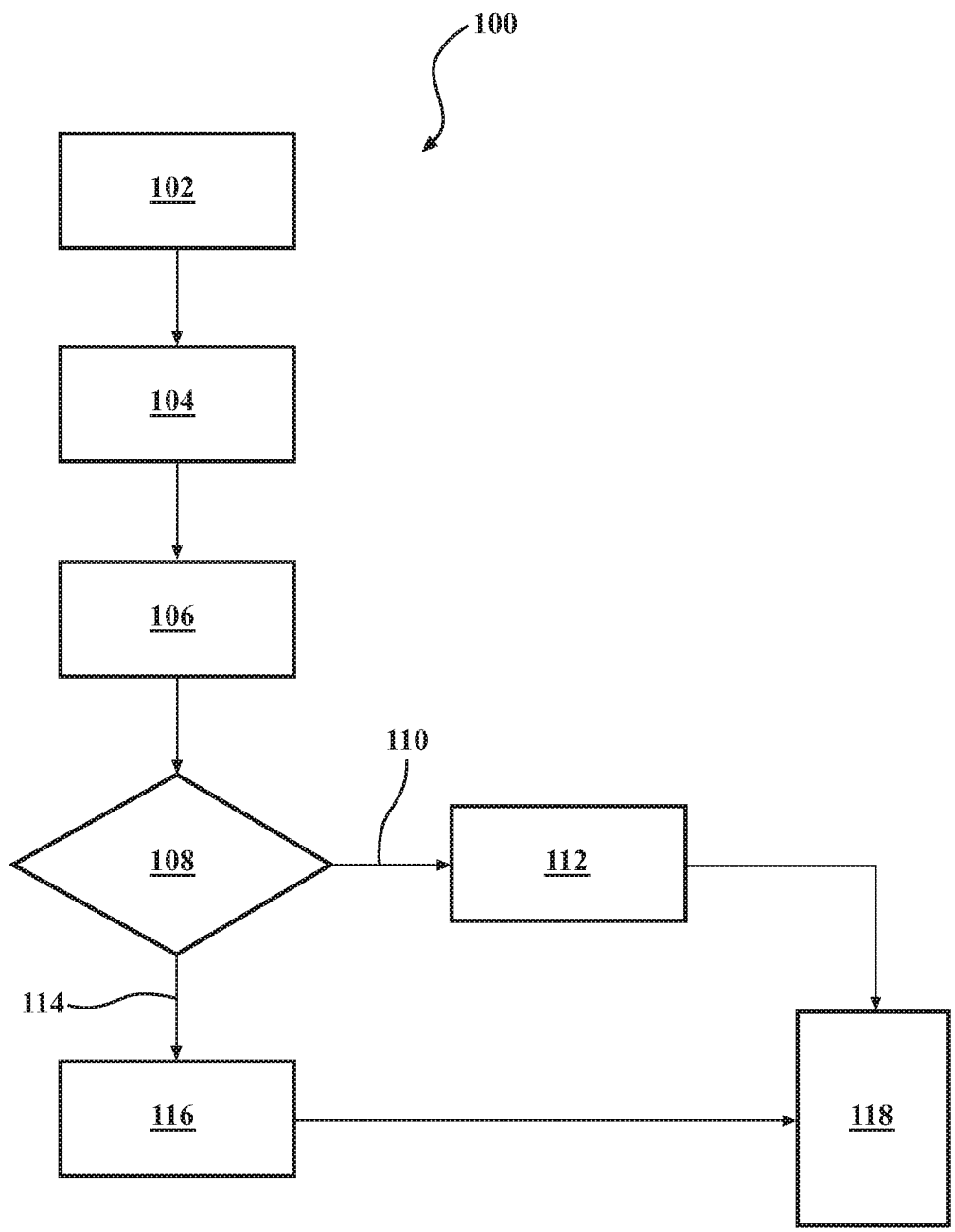
FIG. 5 is a block diagram illustrating a method for a controlling a vehicle propulsion system, according to the principles of the present disclosure.

Referring now to FIG. 5, a flowchart depicting an example method for controlling the propulsion system 10 of the motor vehicle 9 is presented and generally designated at 100. The method 100 may be implemented by the control system 34, and may include any of the details described above with respect to the control system 34. For example, the method 100 includes a step 102 of determining an initial requested transmission ratio Rat_r_i, which may be determined by the reference generator 60 using a base ratio map, as explained above.

The method 100 also includes a step 104 of determining a maximum transmission ratio $Rat_{max}$ and a minimum transmission ratio $Rat_{min}$ based on a plurality of override inputs. The override inputs used to the determine the maximum and minimum transmission ratios $Rat_{max}$, $Rat_{min}$ may be selected from the following, without limitation: a tap-up tap-down input (TUTD) or a manual-up manual-down input (MUMD) originating with a driver, adjustment for engine temperature, adjustment for transmission temperature, selection of a driving mode (such as a sport driving mode or a winter driving mode), implementation of a reverse direction, implementation of a sawtooth ratio mode (wherein the CVT mimics a stepped transmission when making ratio changes), transmission-in-service override (e.g., for when it is desired to run calibration, testing, or service on the transmission), a default, an altitude offset, a heater performance adjustment, detection of pedal instability, implementation of a ratio hold while a driver's foot is lifted (typically used in a sport driving mode), downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, engine overspeed protection, and output speed range.

The method 100 further includes a step 106 of determining an arbitrated requested transmission ratio Rat_r_arb based on applying the maximum and minimum transmission ratios $Rat_{max}$, $Rat_{min}$ to the initial requested transmission ratio Rat_r_i. The method 100 includes a step 108 of determining whether the arbitrated requested transmission ratio Rat_r_arb is within a takeover range 78. If the arbitrated requested transmission ratio Rat_r_arb is within the takeover range 78, the method 100 proceeds along path 110 to a step 112 of determining an ultimate commanded transmission ratio as being based on (or equal to) the arbitrated requested transmission ratio Rat_r_arb. Thus, in step 112, control has been taken from the MPC module 63 and the transmission ratio has been determined in another way, for example, to implement a performance driving transmission ratio.

If, however, in step 108, it is determined that the arbitrated requested transmission ratio Rat_r_arb is outside of the takeover range 78, the method 100 proceeds along a path 114 from step 108 to a step 116. In step 116, the method 100 includes determining the ultimate commanded transmission ratio by generating a plurality of sets of possible command values, each set of possible command values including a possible commanded transmission ratio, determining a cost for each set of possible command values of the plurality of sets of possible command values based on a first predetermined weighting value, a second predetermined weighting value, a plurality of predicted values, and a plurality of requested values including the initial requested transmission ratio, determining which set of possible command values of the plurality of sets of possible command values has a lowest cost, and selecting the set of possible command values that has the lowest cost to define a set of selected command values including the ultimate commanded transmission ratio.

The sub-steps of step 116 may be performed by a MPC module 63, such as described above. For example, the plurality of requested values used to generate the predicted values may include the requested axle torque Ta_r, the requested engine output torque Te_r, a requested transmission ratio Rat_r (which may be the initial requested transmission ratio Rat_r$_i$ or the arbitrated requested transmission ratio Rat_r_arb), and the requested fuel consumption rate FR_r. Furthermore, the method 100 may include determining the predicted values and the cost values, for example, using one or more of the equations (5)-(9) above.

Whether the ultimate commanded transmission ratio is determined in step 112 or step 116, the method 100 then proceeds to a step 118 of commanding predetermined pressures to a transmission pulley assembly to implement the ultimate commanded transmission ratio, where the predetermined pressures are determined based on the ultimate commanded transmission ratio.

The method 100 may include further features, such as determining the cost based further on the ultimate commanded transmission ratio. Thus, even if the ultimate commanded transmission ratio is determined based on the arbitrated requested transmission ratio Rat_r_arb in step 112, the cost may be determined in step 116 by using the ultimate commanded transmission ratio as an input to determine an MPC-selected commanded engine output torque.

Furthermore, the method 100 may include, in the takeover range 78, setting the arbitrated requested transmission ratio as being equal to the maximum transmission ratio $Rat_{max}$ and the minimum transmission ratio $Rat_{min}$'. The method 100 may also include, in an unrestricted portion 70 of a MPC-control range 68 (the MPC-control range 68 being outside of the takeover range 78), determining the maximum transmission ratio $Rat_{max}$ as being equal to a variator maximum ratio and the minimum transmission ratio $Rat_{min}$ as being equal to a variator minimum ratio. Further, the method 100 may include, in a non-performance shift portion 80 of the takeover range 78, determining that the maximum transmission ratio $Rat_{max}$, the minimum transmission ratio $Rat_{min}$, and the arbitrated requested transmission ratio Rat_r_arb are equal to the initial requested transmission ratio Rat_r$_i$ plus a first offset. In addition, the method 100 may include, in a performance shift portion 82 of the takeover range 78, determining that the maximum transmission ratio $Rat_{max}$, the minimum transmission ratio $Rat_{min}$, and the arbitrated requested transmission ratio Rat_r_arb are equal to a performance shift ratio. And in a partially restricted portion 72 of the MPC-control range 68, the method 100 may include determining that the minimum transmission ratio $Rat_{min}$ is equal to the variator minimum ratio plus a second offset and the maximum transmission ratio $Rat_{max}$ is equal to the variator maximum ratio plus a third offset.

The method 100 may also include determining a maximum transmission ratio rate of change $\Delta Rat_{max}$, which may be a maximum transmission speed ratio rate of change, and the method 100 may include limiting a change in the ultimate commanded transmission ratio based on the maximum transmission ratio rate of change $\Delta Rat_{max}$. For an upshift, the maximum transmission ratio rate of change $\Delta Rat_{max}$ may be determined based on the lesser of a predetermined drivability limit and a pump flow rate capability model. For a downshift, the maximum transmission ratio rate of change $\Delta Rat_{max}$ may be determined based on the greater of the predetermined drivability limit and the pump flow rate capability model.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The control system 34 may be configured to execute each of the steps of the method 100. Thus, the entire description with respect to FIGS. 1-5 may be applied by the control system 34 to effectuate the method 100 shown in FIG. 5. Furthermore, the control system 34 may be or include a controller that includes a number of control logics that are configured to execute the steps of the method 100.

The controller(s) of the control system 34 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the disclosure as defined in the appended claims.

What is claimed is:

1. A control system for controlling a propulsion system of a motor vehicle having a transmission and an engine, the control system comprising:
   a first control module having:
      a reference generator configured to generate a plurality of requested values including an initial requested transmission ratio;
      an MPC module configured to generate a plurality of sets of possible command values including a possible commanded transmission ratio, determine a cost for each set of possible command values of the plurality of sets of possible command values based at least on a first predetermined weighting value, a second predetermined weighting value, a plurality of predicted values, and at least one requested value of the plurality of requested values, determine which set of possible command values of the plurality of sets of possible command values has a lowest cost, and select the set of possible command values that has the lowest cost to define a set of selected command values including an MPC-selected commanded transmission ratio; and
   a second control module having:
      a constraints module configured to determine a maximum transmission ratio and a minimum transmission ratio based on a plurality of override inputs, the second control module being configured to determine an arbitrated requested transmission ratio based on applying the maximum transmission ratio and the minimum transmission ratio to the initial requested transmission ratio;
      a takeover module configured to determine whether the arbitrated requested transmission ratio is within a takeover range; and
      a ratio control module configured to:
         set an ultimate commanded transmission ratio based on the arbitrated requested transmission ratio if the arbitrated requested transmission ratio is within the takeover range;
         set the ultimate commanded transmission ratio as the MPC-selected commanded transmission ratio if the arbitrated requested transmission ratio is within an MPC-control range, the MPC-control range and the takeover range being mutually exclusive; and
         command at least one pressure to a transmission pulley assembly configured to implement the ultimate commanded transmission ratio.

2. The control system of claim 1, each set of possible command values including a possible commanded engine output torque, each set of selected command values including a selected commanded engine output torque, the MPC module being configured to determine the cost based further on the ultimate commanded transmission ratio.

3. The control system of claim 2, further comprising a ratio rate arbitration module configured to determine a maximum transmission ratio rate of change, the ratio control module being configured to transition the ultimate commanded transmission ratio from the arbitrated requested transmission ratio to the MPC-selected commanded transmission ratio if the arbitrated requested transmission ratio changes from being in the takeover range to being in the MPC-control range, the control system being configured to limit a change in the ultimate commanded transmission ratio based on the maximum transmission ratio rate of change as the ratio control module ultimate commanded transmission ratio transitions from the arbitrated requested transmission ratio to the MPC-selected commanded transmission ratio.

4. The control system of claim 3, wherein in the takeover range, the constraints module is configured to set the arbitrated requested transmission ratio as being equal to the maximum transmission ratio and the minimum transmission ratio.

5. The control system of claim 4, wherein the constraints module is configured to determine the maximum transmission ratio as being equal to a variator maximum ratio and the minimum transmission ratio as being equal to a variator minimum ratio in an unrestricted portion of the MPC-control range.

6. The control system of claim 5, wherein the constraints module is configured to determine that the maximum transmission ratio, the minimum transmission ratio, and the arbitrated requested transmission ratio are equal to the initial requested transmission ratio plus an offset in a non-performance shift portion of the takeover range.

7. The control system of claim 6, wherein the constraints module is configured to determine that the maximum transmission ratio, the minimum transmission ratio, and the arbitrated requested transmission ratio are equal to a performance shift ratio in a performance shift portion of the takeover range, the offset being a first offset, the constraints module being further configured to determine that the minimum transmission ratio is equal to the variator minimum ratio plus a second offset and the maximum transmission ratio is equal to the variator maximum ratio plus a third offset in a partially restricted portion of the MPC-control range.

8. The control system of claim 7, the maximum transmission ratio rate of change being determined based on the lesser of a predetermined drivability limit and a pump flow rate capability model for an upshift, and the maximum transmission ratio rate of change being determined based on the greater of the predetermined drivability limit and the pump flow rate capability model for a downshift.

9. The control system of claim 8, wherein the plurality of override inputs are selected from the following: a tap-up tap-down input (TUTD), adjustment for engine temperature, adjustment for transmission temperature, selection of a driving mode, implementation of a reverse direction, implementation of a sawtooth ratio mode, a transmission-in-service override, a manual-up manual-down input (MUMD), a default, an altitude offset, a heater performance adjustment, detection of pedal instability, implementation of a ratio hold while a driver's foot is lifted, downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, and engine overspeed protection.

10. The control system of claim 9, wherein the MPC module is configured to determine the plurality of costs with the following cost equation:

$$\text{Cost} = \sum (y(i\,|\,k) - y_{ref})^T Q_Y (y(i\,|\,k) - y_{ref}) +$$
$$(u(i\,|\,k) - u_{ref})^T Q_U (u(i\,|\,k) - u_{ref}) + \Delta u(i\,|\,k)^T Q_{\Delta u} \Delta u(i\,|\,k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=a predicted actual engine output torque;
FR_a=a predicted actual fuel consumption rate;
Rat_a=a predicted actual transmission ratio;
Ta_a=a predicted actual axle torque;
Te_r=a requested engine output torque;
FR_r=a requested fuel consumption rate;
Rat_r=one of: the initial requested transmission ratio and the ultimate commanded transmission ratio;
Ta_r=a requested axle torque;
Te_c=a possible commanded engine output torque;
Rat_c=one of: a possible commanded transmission ratio and the ultimate commanded transmission ratio;
$Q_y$=the first predetermined weighting value;
$Q_u$=the second predetermined weighting value;
$Q_{\Delta u}$=a third predetermined weighting value;
i=the index value;
k=a prediction step; and
T=a transposed vector.

11. The control system of claim 10, wherein the MPC module is configured to determine the predicted actual engine output torque (Te_a), the predicted actual fuel consumption rate (FR_a), the predicted actual transmission ratio (Rat_a), and the predicted actual axle torque (Ta_a) with the following set of equations:

$$x_{k+1} = \left\{ A * x_k + B * \begin{bmatrix} \text{Te\_c}_k \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

$$\begin{bmatrix} \text{Ta\_a}_{k+1} \\ \text{FR\_a}_{k+1} \end{bmatrix} = C * x_{k+1} + w$$

where
$x_{k+1}$=a state variable at a prediction step k+1;
$x_k$=the state variable at a prediction step k;
A=a state matrix;
B=an input matrix;
$\text{Te\_c}_k$=a possible commanded engine output torque at the prediction step k;
$\text{Rat\_c}_k$=one of: a possible commanded transmission ratio at the prediction step k and the ultimate commanded transmission ratio;
$K_{KF}$=a Kalman filter gain;
$\text{Te\_a}_k$=a predicted actual engine output torque at the prediction step k;
$\text{FR\_a}_k$=a predicted actual fuel consumption rate at the prediction step k;
$\text{Rat\_a}_k$=a predicted actual transmission ratio at the prediction step k;
$\text{Ta\_a}_k$=a predicted actual axle torque at the prediction step k;
$\text{Te\_m}_k$=a measured engine output torque at the prediction step k;
$\text{FR\_m}_k$=a measured fuel consumption rate at the prediction step k;
$\text{Rat\_m}_k$=a measured transmission ratio at the prediction step k;
$\text{Ta\_m}_k$=a measured axle torque at the prediction step k;
$\text{Ta\_a}_{k+1}$=a predicted actual axle torque at the prediction step k+1;
$\text{FR\_a}_{k+1}$=a predicted actual fuel consumption rate at the prediction step k+1;
C=an output matrix;
v=process noise; and
w=measurement noise.

12. A method for controlling a propulsion system of a motor vehicle, the method comprising:
determining an initial requested transmission ratio;
determining a maximum transmission ratio and a minimum transmission ratio based on a plurality of override inputs;
determining an arbitrated requested transmission ratio based on applying the maximum transmission ratio and the minimum transmission ratio to the initial requested transmission ratio;

determining whether the arbitrated requested transmission ratio is within a takeover range;

if the arbitrated requested transmission ratio is within the takeover range, determining an ultimate commanded transmission ratio based on the arbitrated requested transmission ratio;

if the arbitrated requested transmission ratio is outside of the takeover range, determining the ultimate commanded transmission based on an MPC-selected commanded transmission ratio, and determining the MPC-selected commanded transmission ratio by generating a plurality of sets of possible command values, each set of possible command values including a possible commanded transmission ratio, determining a cost for each set of possible command values of the plurality of sets of possible command values based on a first predetermined weighting value, a second predetermined weighting value, a plurality of predicted values, and a plurality of requested values including the initial requested transmission ratio, determining which set of possible command values of the plurality of sets of possible command values has a lowest cost, and selecting the set of possible command values that has the lowest cost to define a set of selected command values including the ultimate commanded transmission ratio; and commanding at least one predetermined pressure to a transmission pulley assembly to implement the ultimate commanded transmission ratio based on the ultimate commanded transmission ratio.

13. The method of claim 12, further comprising providing each set of possible command values including a possible commanded engine output torque, providing each set of selected command values including a selected commanded engine output torque, and determining the cost based further on the ultimate commanded transmission ratio.

14. The method of claim 13, further comprising:
in the takeover range, setting the arbitrated requested transmission ratio as being equal to the maximum transmission ratio and the minimum transmission ratio;
in an unrestricted portion of an MPC-control range, the MPC-control range being outside of the takeover range, determining the maximum transmission ratio as being equal to a variator maximum ratio and the minimum transmission ratio as being equal to a variator minimum ratio;
in a non-performance shift portion of the takeover range, determining that the maximum transmission ratio, the minimum transmission ratio, and the arbitrated requested transmission ratio are equal to the initial requested transmission ratio plus a first offset;
in a performance shift portion of the takeover range, determining that the maximum transmission ratio, the minimum transmission ratio, and the arbitrated requested transmission ratio are equal to a performance shift ratio;
in a partially restricted portion of the MPC-control range, determining that the minimum transmission ratio is equal to the variator minimum ratio plus a second offset and the maximum transmission ratio is equal to the variator maximum ratio plus a third offset.

15. The method of claim 14, further comprising:
determining a maximum transmission ratio rate of change; and
limiting a change in the ultimate commanded transmission ratio based on the maximum transmission ratio rate of change in a transition of the ultimate commanded transmission ratio from the arbitrated requested transmission ratio to the MPC-selected commanded transmission ratio.

16. The method of claim 15, further comprising:
for an upshift, determining the maximum transmission ratio rate of change based on the lesser of a predetermined drivability limit and a pump flow rate capability model; and
for a downshift, determining the maximum transmission ratio rate of change based on the greater of the predetermined drivability limit and the pump flow rate capability model,
wherein the plurality of override inputs are selected from the following: a tap-up tap-down input (TUTD), adjustment for engine temperature, adjustment for transmission temperature, selection of a driving mode, implementation of a reverse direction, implementation of a sawtooth ratio mode, a transmission-in-service override, a manual-up manual-down input (MUMD), a default, an altitude offset, a heater performance adjustment, detection of pedal instability, implementation of a ratio hold while a driver's foot is lifted, downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, and engine overspeed protection.

17. The method of claim 16, further comprising:
determining the plurality of costs with the following cost equation:

$$\text{Cost} = \sum (y(i \mid k) - y_{ref})^T Q_Y (y(i \mid k) - y_{ref}) + \\ (u(i \mid k) - u_{ref})^T Q_U (u(i \mid k) - u_{ref}) + \Delta u(i \mid k)^T Q_{\Delta u} \Delta u(i \mid k)$$

$$y = \begin{bmatrix} \text{Te\_a} \\ \text{FR\_a} \\ \text{Rat\_a} \\ \text{Ta\_a} \end{bmatrix}$$

$$y_{ref} = \begin{bmatrix} \text{Te\_r} \\ \text{FR\_r} \\ \text{Rat\_r} \\ \text{Ta\_r} \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=a predicted actual engine output torque;
FR_a=a predicted actual fuel consumption rate;
Rat_a=a predicted actual transmission ratio;
Ta_a=a predicted actual axle torque;
Te_r=a requested engine output torque;
FR_r=a requested fuel consumption rate;
Rat_r=one of: the initial requested transmission ratio in the MPC-control range, and the ultimate commanded transmission ratio in the takeover range;

Ta_r=a requested axle torque;
Te_c=a possible commanded engine output torque;
Rat_c=one of: a possible commanded transmission ratio in the MPC-controlled range, and the ultimate commanded transmission ratio in the takeover range;
$Q_y$=the first predetermined weighting value;
$Q_u$=the second predetermined weighting value;
$Q_{\Delta u}$=a third predetermined weighting value;
i=an index value;
k=a prediction step; and
T=a transposed vector; and
determining the predicted actual engine output torque (Te_a), the predicted actual fuel consumption rate (FR_a), the predicted actual transmission ratio (Rat_a), and the predicted actual axle torque (Ta_a) with the following set of equations:

$$x_{k+1} = \left\{ A * x_k + B * \begin{bmatrix} Te\_c_k \\ Rat\_c_k \end{bmatrix} + v \right\} + K_{KF} * \left( \begin{bmatrix} Te\_m_k \\ FR\_m_k \\ Rat\_m_k \\ Ta\_m_k \end{bmatrix} - \begin{bmatrix} Te\_a_k \\ FR\_a_k \\ Rat\_a_k \\ Ta\_a_k \end{bmatrix} \right)$$

$$\begin{bmatrix} Ta\_a_{k+1} \\ FR\_a_{k+1} \end{bmatrix} = C * x_{k+1} + w$$

where
$x_{k+1}$=a state variable at a prediction step k+1;
$x_k$=the state variable at a prediction step k;
A=a state matrix;
B=an input matrix;
$Te\_c_k$=a possible commanded engine output torque at the prediction step k;
$Rat\_c_k$=one of: a possible commanded transmission ratio at the prediction step k in the MPC-control range, and the ultimate commanded transmission ratio in the takeover range;
$K_{KF}$=a Kalman filter gain;
$Te\_a_k$=a predicted actual engine output torque at the prediction step k;
$FR\_a_k$=a predicted actual fuel consumption rate at the prediction step k;
$Rat\_a_k$=predicted actual transmission ratio at the prediction step k;
$Ta\_a_k$=a predicted actual axle torque at the prediction step k;
$Te\_m_k$=a measured engine output torque at the prediction step k;
$FR\_m_k$=a measured fuel consumption rate at the prediction step k;
$Rat\_m_k$=a measured transmission ratio at the prediction step k;
$Ta\_m_k$=a measured axle torque at the prediction step k;
$Ta\_a_{k+1}$=a predicted actual axle torque at the prediction step k+1;
$FR\_a_{k+1}$=a predicted actual fuel consumption rate at the prediction step k+1;
C=an output matrix;
v=process noise; and
w=measurement noise.

18. A propulsion system for a motor vehicle, comprising:
an engine operable to power the motor vehicle, the engine having an engine output shaft configured to transfer engine output torque;
a continuously variable transmission having a variator assembly including a first pulley and a second pulley, the first and second pulleys being rotatably coupled by a rotatable member, at least one of the first and second pulleys including a movable sheave translatable along an axis to selectively change a transmission ratio between the engine output shaft and a transmission output shaft; and
an engine control module comprising:
a reference generator configured to generate a plurality of requested values including an initial requested transmission ratio; and
an MPC module configured to generate a plurality of sets of possible command values including a possible commanded transmission ratio, determine a cost for each set of possible command values of the plurality of sets of possible command values based at least on a first predetermined weighting value, a second predetermined weighting value, a plurality of predicted values, and at least one requested value of the plurality of requested values, determine which set of possible command values of the plurality of sets of possible command values has a lowest cost, and select the set of possible command values that has the lowest cost to define a set of selected command values including an MPC-selected commanded transmission ratio; and
a transmission control module comprising:
a constraints module configured to determine a maximum transmission ratio and a minimum transmission ratio based on a plurality of override inputs, the transmission control module being configured to determine an arbitrated requested transmission ratio based on applying the maximum transmission ratio and the minimum transmission ratio to the initial requested transmission ratio;
a takeover module configured to determine whether the arbitrated requested transmission ratio is within a takeover range; and
a ratio control module configured to:
set an ultimate commanded transmission ratio based on the arbitrated requested transmission ratio if the arbitrated requested transmission ratio is within the takeover range;
set the ultimate commanded transmission ratio as the MPC-selected commanded transmission ratio if the arbitrated requested transmission ratio is within an MPC-control range, the MPC-control range and the takeover range being mutually exclusive; and
command a plurality of pressures to a transmission pulley assembly configured to implement the ultimate commanded transmission ratio.

19. The propulsion system of claim 18, each set of possible command values including a possible commanded engine output torque, each set of selected command values including a selected commanded engine output torque, the MPC module being configured to determine the cost based further on the ultimate commanded transmission ratio,
wherein in the takeover range, the constraints module is configured to set the arbitrated requested transmission ratio as being equal to the maximum transmission ratio and the minimum transmission ratio,
wherein in an unrestricted portion of the MPC-control range, the constraints module is configured to determine the maximum transmission ratio as being equal to a variator maximum ratio and the minimum transmission ratio as being equal to a variator minimum ratio, wherein in a non-performance shift portion of the takeover range, the constraints module is configured to determine that the maximum transmission ratio, the minimum transmission ratio, and the arbitrated requested transmission ratio are equal to the initial requested transmission ratio plus a first offset, wherein in a performance shift portion of the takeover range, the constraints module is configured to determine that the maximum transmission ratio, the minimum transmission ratio, and the arbitrated requested transmission ratio are equal to a performance shift ratio, wherein in a partially restricted portion of the MPC-control range, the constraints module is configured to determine that the minimum transmission ratio is equal to the variator minimum ratio plus a second offset and the maximum transmission ratio is equal to the variator maximum ratio plus a third offset, wherein the transmission control module further comprises a ratio rate arbitration module configured to determine a maximum transmission ratio rate of change, the propulsion system being configured to limit a change in the ultimate commanded transmission ratio based on the maximum transmission ratio rate of change in a transition of the ultimate commanded transmission ratio from the arbitrated requested transmission ratio to the MPC-selected commanded transmission ratio, the maximum transmission ratio rate of change being determined based on the lesser of a predetermined drivability limit and a pump flow rate capability model for an upshift, and the maximum transmission ratio rate of change being determined based on the greater of the predetermined drivability limit and the pump flow rate capability model for a downshift, and wherein the plurality of override inputs are selected from the following: a tap-up tap-down input (TUTD), adjustment for engine temperature, adjustment for transmission temperature, selection of a driving mode, implementation of a reverse direction, implementation of a sawtooth ratio mode, a transmission-in-service override, a manual-up manual-down input (MUMD), a default, an altitude offset, a heater performance adjustment, detection of pedal instability, implementation of a ratio hold while a driver's foot is lifted, downshift ratio limiting, powertrain braking, traction control, selection of a neutral ratio mode, detection of coasting, detection of a change in driver intent, detection of a busy foot driving condition, a brake compensation condition, detection of braking under at least one predetermined condition, determination of an engine protection mode, detection of a predetermined critical maneuver, control for ratio drift, downshifting to exit a selected driving mode, implementation of a real-time constraint ratio determination scheme, and engine overspeed protection.

20. The propulsion system of claim 19, wherein the MPC module is configured to determine the plurality of costs with the following cost equation:

$$\text{Cost} = \sum (y(i|k) - y_{ref})^T Q_Y (y(i|k) - y_{ref}) +$$
$$(u(i|k) - u_{ref})^T Q_U (u(i|k) - u_{ref}) + \Delta u(i|k)^T Q_{\Delta u} \Delta u(i|k)$$

$$y = \begin{bmatrix} \text{Te\_a} \\ \text{FR\_a} \\ \text{Rat\_a} \\ \text{Ta\_a} \end{bmatrix}$$

-continued $$y_{ref} = \begin{bmatrix} \text{Te\_r} \\ \text{FR\_r} \\ \text{Rat\_r} \\ \text{Ta\_r} \end{bmatrix}$$

$$u = \begin{bmatrix} \text{Te\_c} \\ \text{Rat\_c} \end{bmatrix}$$

$$u_{ref} = \begin{bmatrix} \text{Te\_r} \\ \text{Rat\_r} \end{bmatrix}$$

where
Te_a=a predicted actual engine output torque;
FR_a=a predicted actual fuel consumption rate;
Rat_a=a predicted actual transmission ratio;
Ta_a=a predicted actual axle torque;
Te_r=a requested engine output torque;
FR_r=a requested fuel consumption rate;
Rat_r=one of: the initial requested transmission ratio and the ultimate commanded transmission ratio;
Ta_r=a requested axle torque;
Te_c=a possible commanded engine output torque;
Rat_c=one of: a possible commanded transmission ratio and the ultimate commanded transmission ratio;
$Q_y$=the first predetermined weighting value;
$Q_u$=the second predetermined weighting value;
$Q_{\Delta u}$=a third predetermined weighting value;
i=an index value;
k=a prediction step; and
T=a transposed vector, and
wherein the MPC module is configured to determine the predicted actual engine output torque (Te_a), the predicted actual fuel consumption rate (FR_a), the predicted actual transmission ratio (Rat_a), and the predicted actual axle torque (Ta_a) with the following set of equations:

$$x_{k+1} = \left\{ A * x_k + B * \begin{bmatrix} \text{Te\_c}_k \\ \text{Rat\_c}_k \end{bmatrix} + v \right\} + K_{KF} * \left( \begin{bmatrix} \text{Te\_m}_k \\ \text{FR\_m}_k \\ \text{Rat\_m}_k \\ \text{Ta\_m}_k \end{bmatrix} - \begin{bmatrix} \text{Te\_a}_k \\ \text{FR\_a}_k \\ \text{Rat\_a}_k \\ \text{Ta\_a}_k \end{bmatrix} \right)$$

$$\begin{bmatrix} \text{Ta\_a}_{k+1} \\ \text{FR\_a}_{k+1} \end{bmatrix} = C * x_{k+1} + w$$

where
$x_{k+1}$=a state variable at a prediction step k+1;
$x_k$=the state variable at a prediction step k;
A=a state matrix;
B=an input matrix;
$\text{Te\_c}_k$=a possible commanded engine output torque at the prediction step k;
$\text{Rat\_c}_k$=one of: a possible commanded transmission ratio at the prediction step k and the ultimate commanded transmission ratio;
$K_{KF}$=a Kalman filter gain;
$\text{Te\_a}_k$=a predicted actual engine output torque at the prediction step k;
$\text{FR\_a}_k$=a predicted actual fuel consumption rate at the prediction step k;
$\text{Rat\_a}_k$=a predicted actual transmission ratio at the prediction step k;

Ta_$a_k$=a predicted actual axle torque at the prediction step k;
Te_$m_k$=a measured engine output torque at the prediction step k;
FR_$m_k$=a measured fuel consumption rate at the prediction step k;
Rat_$m_k$=a measured transmission ratio at the prediction step k;
Ta_$m_k$=a measured axle torque at the prediction step k;
Ta_$a_{k+1}$=a predicted actual axle torque at the prediction step k+1;
FR_$a_{k+1}$=a predicted actual fuel consumption rate at the prediction step k+1;
C=an output matrix;
v=process noise; and
w=measurement noise.

* * * * *